(12) United States Patent
Opsomer et al.

(10) Patent No.: US 11,657,738 B2
(45) Date of Patent: May 23, 2023

(54) FOLDABLE SPACEFRAME AND METHOD OF SETTING UP SPACEFRAME STRUCTURE

(71) Applicant: Production Resource Group, LLC, New Windsor, NY (US)

(72) Inventors: Frederic Opsomer, Kortemark (BE); Marc Fichefet, Ostend (BE); Mario Hosten, Diksmuide (BE)

(73) Assignee: Production Resource Group LLC, New Windsor, NY (US)

( * ) Notice: Subject to any disclaimer, the term of this patent is extended or adjusted under 35 U.S.C. 154(b) by 1249 days.

(21) Appl. No.: 15/873,181

(22) Filed: Jan. 17, 2018

(65) Prior Publication Data

US 2018/0211575 A1  Jul. 26, 2018

Related U.S. Application Data

(60) Provisional application No. 62/447,695, filed on Jan. 18, 2017.

(51) Int. Cl.
| | |
|---|---|
| *E04B 1/19* | (2006.01) |
| *E04H 12/18* | (2006.01) |
| *E04B 1/343* | (2006.01) |
| *G09F 17/00* | (2006.01) |
| *G02B 5/12* | (2006.01) |
| *G09F 15/00* | (2006.01) |
| *E04B 1/344* | (2006.01) |

(52) U.S. Cl.
CPC .............. *G09F 17/00* (2013.01); *E04B 1/344* (2013.01); *E04H 12/18* (2013.01); *G02B 5/12* (2013.01); *G09F 15/0068* (2013.01); *E04B 1/19* (2013.01); *E04B 1/343* (2013.01); *E04B 2001/1921* (2013.01); *E04H 12/187* (2013.01); *G09F 2017/0083* (2013.01)

(58) Field of Classification Search
CPC ...... G09G 17/00; E04H 12/18; E04H 12/187; E04B 1/344; E04B 2001/1996; E04B 2001/1975; E04B 2001/1931; E04B 2001/1954; E04B 1/19; E04B 1/1903; E04B 2001/1921; E04B 1/34357; E04B 1/343; E04B 12/185; G09F 15/0068; G09F 2017/0083; G02B 5/12
See application file for complete search history.

(56) References Cited

U.S. PATENT DOCUMENTS

| | | | | |
|---|---|---|---|---|
| 3,783,573 A | * | 1/1974 | Vaughan | E01D 15/124 52/646 |
| 4,522,008 A | * | 6/1985 | Zeigler | E04H 12/18 52/646 |
| 4,539,786 A | * | 9/1985 | Nelson | B64G 9/00 244/159.5 |
| 5,213,165 A | * | 5/1993 | Dunn | A01B 31/00 172/311 |
| 6,213,219 B1 | * | 4/2001 | Mosdal | A01B 73/044 172/311 |

(Continued)

*Primary Examiner* — Phi D A
(74) *Attorney, Agent, or Firm* — Law Office of Scott C Harris

(57) ABSTRACT

Foldable spaceframes that can be easily collapsed and unfolded to construct structurally stable (temporary) walls, for instance for events (concerts, shows, etc.) upon which (digital) display elements can be deployed, as well as a method for the construction of overlying structures comprising the spaceframes.

17 Claims, 19 Drawing Sheets

(56) References Cited

U.S. PATENT DOCUMENTS

| | | | | |
|---|---|---|---|---|
| 7,963,084 B2* | 6/2011 | Merrifield | ............... | E04C 3/005 |
| | | | | 52/646 |
| 8,371,088 B2* | 2/2013 | Merrifield | ............. | E01D 15/124 |
| | | | | 52/646 |
| 8,621,815 B2* | 1/2014 | Daas | ..................... | E04B 1/3441 |
| | | | | 52/645 |
| 2002/0092626 A1* | 7/2002 | Beall | ........................ | A47G 5/00 |
| | | | | 160/135 |
| 2015/0047240 A1* | 2/2015 | Pyc | ..................... | F16M 11/046 |
| | | | | 40/611.01 |
| 2017/0171991 A1* | 6/2017 | McPhillips | ......... | G09F 15/0068 |

* cited by examiner

FOLDABLE SPACEFRAME AND METHOD OF SETTING UP SPACEFRAME STRUCTURE

This application claims priority from provisional application No. 62/447,695, filed Jan. 18, 2017, the entire contents of which are herewith incorporated by reference.

TECHNICAL FIELD

The invention pertains to the technical field of foldable spaceframes that can be easily collapsed and unfolded to construct structurally stable walls, that can be temporary; for instance for events (concerts, shows, etc.) upon which display elements can be deployed, as well as a method for the construction of overlying structures comprising the spaceframes.

BACKGROUND

There remains a need in the art for an improved foldable spaceframe for constructing wall structures and capable of supporting display elements, e.g., digital display elements.

U.S. Pat. No. 3,354,596 describes a foldable wall scaffolding structure that can be constructed modularly. However, the proposed structure is lacking both in compactness and in coupling capacity to neighboring structures. Due to the hinging of the arms connecting the front frame to the back frame (as can be seen in FIG. 5 of the document), the collapsed structure will not only still have a substantial thickness, but will also become longer, which inconveniences transport of these structures. Lastly however, the structure requires a specific stabilizing unit to maintain the unfolded position. Such a stabilizing unit can be easily damaged, as the scaffolding structures are typically used in strongly varying conditions, often unfavorable. In case of damage, the scaffolding unit could no longer be locked at an unfolded position which could result in a dangerous situation should it collapse at an unforeseen moment (i.e. during a concert, etc.).

A second such foldable spaceframe is provided in U.S. Pat. No. 8,813,455, which describes a foldable truss. However, the proposed structure is not suitable to be used as a (vertical) wall, as it can easily revert into a more folded position. Additionally, the separate structures are not easily manipulated by an operator, as they will be far too heavy for manual placement in case of use as a wall element. Furthermore, there is no option present to connect several of the trusses to form some kind of an artificial wall, even if the first problem were to be solved.

A third foldable spaceframe is shown in U.S. Pat. No. 7,716,897, but again provides a foldable truss, which has the same disadvantages as the previous example.

The applicant has noticed in the past that no stable structures of some height exist for holding display elements such as LED screens, especially in high constructions such as stage elements (hanging walls). Due to improvements in technology, the digital display elements become brighter every year. This necessitates that the display elements are attached at the bottom of the stage element to the ground or a stage surface or others by cables, or lines, or other. This has the downside that those display elements have excess wind resistance, causing them to act as sails in these high constructions (attached at top and at bottom), even when openings are provided between the display elements. This can induce very dangerous situations, where the structures catch wind and experience very strong forces and pressures orthogonal to the plane of the screen. Considering the fact that they have been grounded to ensure that the screen is held tight (to prevent waving of the screen due to wind), these forces could cause the screen to start bending and even to break if sufficient wind or other forces are applied. This is mainly due to the fact that current structures are only designed to withstand longitudinal forces (from bottom to top, basically gravitation forces) and are meant to support that which hangs from the top trusses. No measures have taken up till now to include a back trussing for support perpendicular to the plane of the screen.

One of the options used for this problem is the use of so called wind trussing. These structures are added to the construction as a sort of backing for the wall structures at regular intervals to avoid the structure from breaking due to wind or other forces. However, these additional trussing structures take a lot of costly place in transport (both economically as ecologically), as well as a lot of costly time in setting up. Even in the best cases, this is a makeshift solution as not every wind trussing can be combined with every screen structure.

All in all, the present invention aims to resolve at least some of the problems mentioned above, and provides an all-in solution of stable constructions for holding display elements with built-in wind trussing as well as very high compactness for transport.

SUMMARY OF THE INVENTION

The present invention in a first aspect provides a foldable modular spaceframe for holding one or more display elements, preferably digital display elements, comprising:
  a. a polygonal front frame for holding the display elements and/or panels, whereby said panels are preferably suitable for attaching the display elements thereto;
  b. a rigid and planar first truss frame, said first truss frame comprising at least two hinge arms and a longitudinal connector beam, whereby said first truss frame is hingedly attached with the hinge arms to the front frame at one end of the hinge arms, preferably each of the hinge arms being attached at said one end to the front frame towards opposite edges of the front frame, whereby said connector beam rigidly connects the ends of the hinge arms not attached to the front frame, whereby the first truss frame is adapted to hinge around a first hinge axis to which the connector beam is substantially parallel, and whereby said connector beam comprises at least two locking elements;
  c. a rigid and planar second truss frame, said second truss frame comprising at least two hinge arms, whereby said second truss frame is hingedly attached with the hinge arms to the front frame at one end of the hinge arms, preferably each of the hinge arms being attached at said one end to the front frame towards opposite edges of the front frame, whereby the second truss frame is adapted to hinge around a second hinge axis, to which the first hinge axis is substantially parallel, and whereby the ends of the hinge arms not attached to the front frame, are adapted for detachably interlocking with the locking elements of the connector beam of the first truss frame, preferably whereby said unattached ends of the hinge arms comprise locking elements for said detachable interlocking;
whereby the hinge axis of the first truss frame and the hinge axis of the second truss frame respectively lie in a first and a second plane parallel to the front frame, thereby allowing the first and the second truss frame to be folded towards the front frame to a substantially parallel position to said front frame, preferably said first and second plane being distanced over at least 20 mm from each other.

In a second aspect, the present invention provides a method for constructing a modular wall structure from a plurality of foldable spaceframes, said spaceframes being as described in this document, comprising the following steps:
a. providing two or more sets each of two or more the folded spaceframes, whereby said spaceframes are aligned and positioned substantially vertically, whereby the first and the second hinge axes are positioned substantially vertical, preferably whereby each set is provided on a dolly adapted for holding the spaceframes, more preferably adapted for holding the spaceframes in the sets over a regular distance from each other;
b. unfolding a first spaceframe from at least two or more of the sets, by unfolding the first truss frame, unfolding the second truss frame and interlocking the first truss frame with the second truss frame at the longitudinal connector beam of the first truss frame;
c. laterally interlocking the unfolded spaceframes with neighboring unfolded spaceframes, thereby creating a row of laterally interlocked spaceframes;
d. lifting the row of laterally interlocked spaceframes vertically to a position hanging closely above the sets of the remaining spaceframes;
e. repeating steps b and c on the sets of the remaining spaceframes, thereby creating a new row of laterally interlocked spaceframes;
f. vertically interlocking the new row of laterally interlocked spaceframes to the row of laterally interlocked spaceframes hanging closely above the new row;
g. lifting the vertically interlocked rows of laterally interlocked spaceframes vertically to a position hanging closely above the sets of the remaining spaceframes;
h. optionally repeating steps b to g one or more times.

In a further aspect, the present invention provides for a dolly for holding and transporting a plurality of the spaceframes according to the invention.

DETAILED DESCRIPTION OF THE INVENTION

Figure 1:
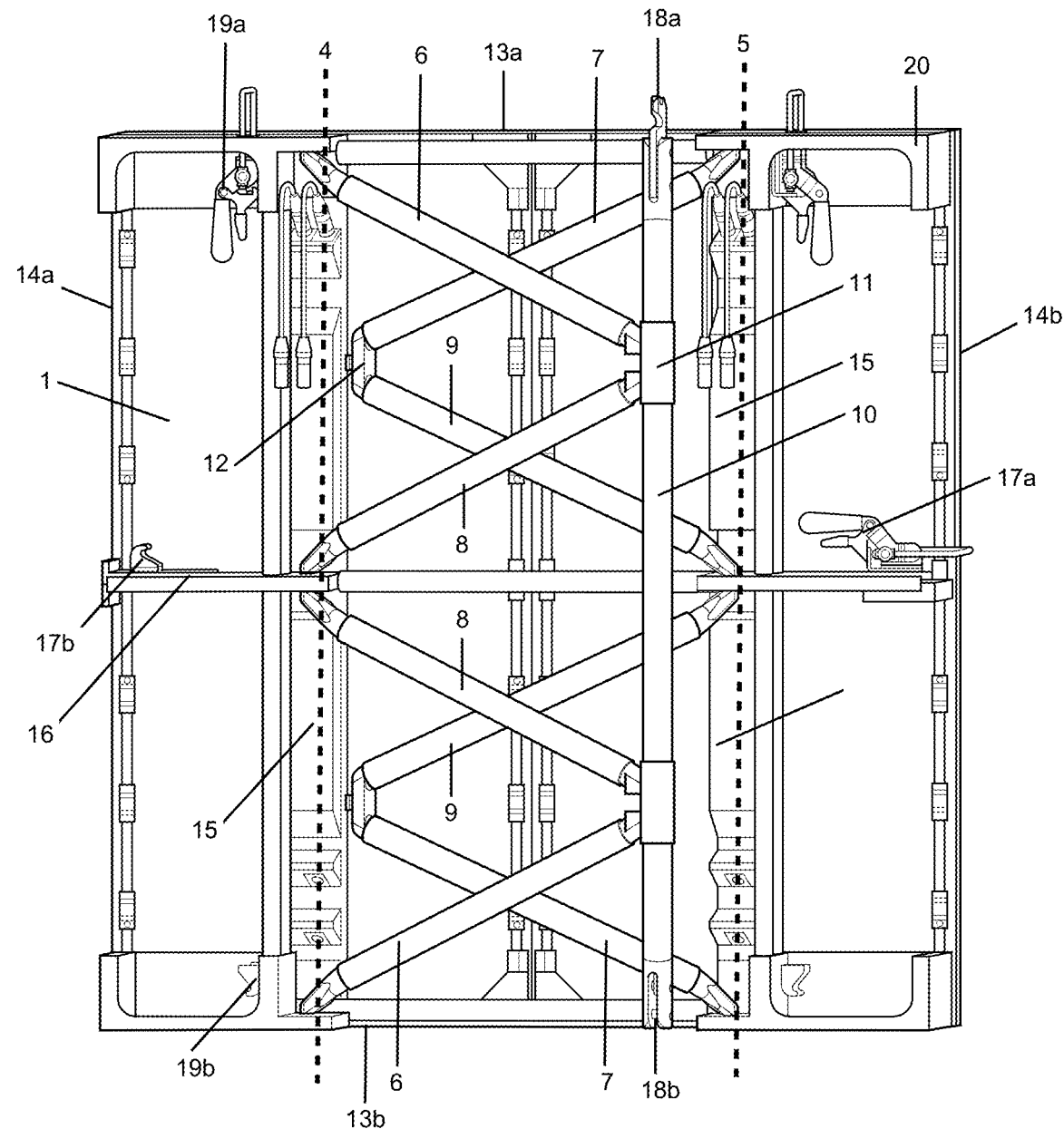
FIG. 1 shows an embodiment of a spaceframe according to the invention.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

In a first aspect, the invention provides a foldable modular spaceframe for holding one or more display elements, preferably digital display elements, comprising:
a. a polygonal front frame for holding the display elements and/or panels, whereby said panels are preferably suitable for attaching the display elements thereto;
b. a rigid and planar first truss frame, said first truss frame comprising at least two hinge arms and a longitudinal connector beam, whereby said first truss frame is hingedly attached with the hinge arms to the front frame at one end of the hinge arms, preferably each of the hinge arms being attached at said one end to the front frame towards opposite edges of the front frame, whereby said connector beam rigidly connects the ends of the hinge arms not attached to the front frame, whereby the first truss frame is adapted to hinge around a first hinge axis to which the connector beam is substantially parallel, and whereby said connector beam comprises at least two locking elements;
c. a rigid and planar second truss frame, said second truss frame comprising at least two hinge arms, whereby said second truss frame is hingedly attached with the hinge arms to the front frame at one end of the hinge arms, preferably each of the hinge arms being attached at said one end to the front frame towards opposite edges of the front frame, whereby the second truss frame is adapted to hinge around a second hinge axis, to which the first hinge axis is substantially parallel, and whereby the ends of the hinge arms not attached to the front frame, are adapted for detachably interlocking with the locking elements of the connector beam of the first truss frame, preferably whereby said unattached ends of the hinge arms comprise locking elements for said detachable interlocking;

whereby the hinge axis of the first truss frame and the hinge axis of the second truss frame respectively lie in a first and a second plane parallel to the front frame, thereby allowing the first and the second truss frame to be folded towards the front frame to a substantially parallel position to said front frame, preferably said first and second plane being distanced over at least 20 mm from each other.

In a first point, it should be mentioned that the applicant envisions to provide specific frames for holding display elements, in particular digital display elements such as LED screens. The invention particularly is of application to the field of staging elements, such as for concerts (tours), spectacles, shows and other such events which need stages that can be rapidly set up and dismantled, with a high guarantee for safety.

As mentioned, none of the known solutions to the problems in this field suffice, as they are makeshift solutions with severe disadvantages as mentioned (weight, volume for transport, ease of setting up and taking down, and stability since the currently used systems are not used as they were intended). The applicant has therefore seen the possibility of building a foldable and modular spaceframe structure, which can be expanded (unfolded) so that the display structure (front) has a supporting structure (spaceframe) with some depth, and thus some stability. Furthermore, as the spaceframe is connectable to other such spaceframes above and/or below at the 'back' of the spaceframe, where the additional depth is created, this creates a stronger overlying structure.

The applicant has solved these problems inventively by producing a foldable structure, with a prismatic back trussing having two truss frames which hinge around parallel hinge axes, and which interlock with each other when unfolded. The first and second truss frames can be folded over each other due to the fact that their hinge axis is distanced differently with respect to the plane of the front frame. Due to this construction, the folded spaceframe has a very small thickness which allows for optimal use of transport space, and additionally would allow the handling of the spaceframe by a single person. Furthermore, by the simplicity of this back trussing, the spaceframe can very easily be unfolded and set up (secured) by very little actions, this again strongly opposed to the systems known in the prior art. Since there are no double-hinging arms but only the prismatic structure, the strength of the back trussing is also greatly improved over many known constructions. Lastly, there is only a single axis (at one or more, typically two) points at which the unfolded spaceframe needs to be secured (interlocked) to ensure the stability, this again as opposed by many prior art systems where a number of hinges need to be blocked and a number of connections need to be locked.

The locking elements of the first truss frame are preferably adapted for easily receiving the second truss frame (and/or the locking elements thereof), thereby fixing the 'unfolded' position of the truss frames. Most preferably, a mechanism is present to then interlock the two truss frames at said locking elements, for instance by sliding a pin into position which prevents the detaching of the two truss frames at the locking elements. In a preferred embodiment, the locking element of the first truss frame is a receiving locking element adapted for receiving the locking elements of the second truss frame, although the opposite situation could be used as well. The 'non-receiving' locking elements is a spring pin with a skewing profile so that the pin is pushed down when the locking elements of the two truss frames are pushed together until the spring pin is able to extend back behind a part of the receiving locking element, thus securing the interlocked position. Said spring pin can then be pushed back down manually when the interlocked position needs to be opened.

Preferably, the first and the second truss frame are adapted to be rotated around their hinge axes up to a certain angle with respect to the front frame.

Preferably, the front frame is rectangular or even square, as this is easier to be used in larger constructions (although other forms suitable for tessellation of a flat surface could be used, such as triangles, hexagons or others). The hinge axes will, in the case of a rectangular front frame, be parallel to a first and a second edge of said front frame. Preferably, the spaceframes will be used whereby the hinge axes extend vertically with respect to the surface, as they are designed to increase vertical stability. The connector beams of neighboring spaceframes (above and beyond in this case) can be connected on the ends thereof, which provides a connection in a secondary plane (aside from the front frame), thus adding additional stability along the vertical axis. This is a highly desirable situation as this improved vertical stability is precisely the point where most known structures fail (due to the display elements acting as sails).

In a preferred embodiment of the invention, the first truss frame comprises two additional hinge arms, said additional hinge arms at one end being hingedly attached to the front frame along the first hinge axis and are adapted to hinge around said first hinge axis, whereby the additional hinge arms join each join one of the hinge arms at one of the locking elements of the connector beam, preferably whereby said additional hinge arms are attached to the front frame towards a central region of the front frame. Furthermore, the second truss frame comprises two additional hinge arms, said additional hinge arms at one end being hingedly attached to the front frame along the second hinge axis and are adapted to hinge around said second hinge axis, whereby the additional hinge arms join each join one of the hinge arms at the ends thereof not attached to the front frame, preferably whereby said additional hinge arms are attached to the front frame towards a central region of the front frame.

Additional hinge arms provide more strength to the unfolded structure, and can provide strength under different angles. This will avoid any danger of the truss frames plying or deforming. Furthermore, by having the additional hinge arms end at the locking elements (or joining the hinge arms at their ends, which essentially are secondary locking elements), it is ensured that these locking elements are supported, again under varying angles, and will ensure a reliable securing of the two truss frames to each other. Lastly, it is to be noted that the additional hinge arms do not create a thicker folded spaceframe considering the fact that they fold over each other (see Figures), as is the case for the hinge arms themselves, since the additional hinge arms of the first and second truss frame lie at a different distance from the front frame.

In a further preferred embodiment, the first and second truss frame are furthermore connected to the front frame via the additional hinge arms to a protruding spacer element on each side, which spacer element extends to the nearest edge parallel to the first or second hinge axis.

This protruding spacer element not only provides a suitable base for the additional hinge arms to be hingedly connected to, furthermore, by extending from the front frame, it protects the elements of the spaceframe when folded in. During transport, the spaceframes will be stacked or manipulated and can undergo strong movements, which could result in damage. However, the spacer elements extend from the front frame to a height thicker than the thickness of the folded truss frames (both second and first), thereby protecting them. Furthermore, it provides an additional reinforcement for the central zone of the front frame by extending from a more central region to the closest edge of the front frame (for instance providing a support from the rear to display elements or panels attached to the spaceframe), as well as providing a support for further interlocking means as are discussed further in this document.

In a preferred embodiment, the front frame comprises one or more, preferably two, panels, whereby said panels comprise a back and a front, said front comprising a power management system, suitable for being wiredly coupled to an external power supply for receiving power, and preferably adapted to receive control signals wiredly from an external control system, whereby said power management system is positioned substantially along the first and/or the second hinge axis (preferably excepting regions of said axes where the hinge arms are attached to the front frame), and whereby said first and second hinge axis are distanced from each other over a distance higher than the distance between the first hinge axis and the connector beam, and higher than the distance between the second hinge axis and the unattached ends of the hinge arms of the second truss frame.

Preferably, said panels are detachable from the front frame (and thus from the spaceframe), which allows easy replacement or repairs, even when the spaceframes are unfolded and part of a greater structure. Specifically, the panels are LED displays or LED screens, and can be powered and controlled from the back of the front frame, where one or more power management systems are provided. Said power management systems can be connected to an external power supply and additionally to a control system (central controller that controls what is displayed). As can be seen in the figures, by placing these power management systems along one or more of the hinge axes, specifically towards the closest parallel edge of the front frame, it is assured that the truss frames do not fold over the power management systems, which are thus protected.

By furthermore having the hinge axes being distanced from each other so that, when the truss frames are folded in, the truss frames essentially lie between the two hinge axes, the compactness of the folded spaceframe is assured.

In a preferred embodiment, the front frame is substantially rectangular, preferably square, and whereby the first and second hinge axis are substantially perpendicular to a first and a second edge of the substantially rectangular front frame and substantially parallel to a third and fourth edge of the front frame, whereby the third and the fourth edge of the front frame each comprise at least one lateral interlocking element, said lateral interlocking elements being suitable for detachably interlocking with a lateral interlocking element of a different foldable modular spaceframe, preferably whereby the first hinge axis and the second hinge axis are distanced from the third and fourth edges over at least 10%, preferably 15%, of the length of the first edge. The latter may be understood as each hinge axis being distanced from a closest parallel edge (to said hinge axis) of the space frame over at least the aforementioned distance.

As previously mentioned, the front frame will typically be rectangular as this allows an intuitive set-up and easy planning, as well as being optimal for conservation of space during transport. The minimal distance from the hinge axes to the closest parallel edge of the front frame ensures for one that the lateral interlocking elements can be placed in an operable position. Additionally, as will be discussed further, other interlocking elements (longitudinal) may be provided in the 'free' zones between the hinge axes and the closest parallel edge of the front frame to attach the spaceframe to another such spaceframe via the first or second edge (perpendicular to the hinge axes).

Preferably, a single lateral interlocking element is provided on both the third and the fourth edge of the front frame, towards the middle of said edges (not that more can be provided however, typically interspersed over the length of said edges). Typically, one of these will be a male interlocking element, the other a female interlocking element to allow easy interlocking when building greater structures with the spaceframes. In a particularly preferred embodiment, the lateral interlocking elements will be provided on (or supported by) spacer elements as discussed earlier, as these can ensure that the lateral interlocking elements are strongly attached to the front frame.

In a particularly preferred embodiment, the front frame is substantially rectangular, and the first hinge axis and the second hinge axis are distanced from the closest parallel edges of the front frame over at least 10%, preferably 15%, and at most 30% of the length of the perpendicular edges. Preferably, they are distanced from said closest edge over about 18% to 25% of said length, and more preferably distanced from said closest edge over about 21% of said length. The same provisions as above for the lateral interlocking elements may additionally apply.

In a further preferred embodiment, the lateral interlocking element on the third edge comprises a lateral latch clamp, and whereby the lateral interlocking element on the fourth edge comprises a lateral latch, whereby said lateral latch clamp is suitable for detachably clamping a lateral latch of a different foldable modular spaceframe, and whereby said lateral latch is suitable for being detachably clamped by a lateral latch clamp of a different foldable modular spaceframe, preferably whereby said lateral latch clamp is positioned towards a central region of the third edge and preferably whereby said lateral latch is positioned towards a central region of the fourth edge.

Note that the particular choice for a latch clamp system in no way precludes other interlocking systems from this document. However, the applicant has found that this particular type of clamp is ideal due to the ease with which one can interlock neighboring spaceframes via this system. In particular, once the spaceframes are moved adjacent to each other, the latch clamp's hook moves over the latch of the neighboring spaceframe, and hooks around said latch when the latch clamp is closed, thereby providing a very secure coupling between the two spaceframes. Preferably, the latch clamp is a pull-action latch clamp, examples of these are the Destaco® U and J-hook types.

In a further preferred embodiment, the lateral interlocking elements are adapted to allow a rigid interlocking to a different foldable modular spaceframe under a settable angle between the front frame of the spaceframe and the front frame of the different spaceframe, preferably whereby said settable angle can be set between −30° and 30°, preferably between −20° and 20°, more preferably between −15° and 15°, for instance 14°, 13°, 12°, 11°, 10°, 9°, 8°, 7°, 6°, 5°, 4°, 3°, 2°, 1°, −14°, −13°, −12°, −11°, −10°, −9°, −8°, −7°, −6°, −5°, −4°, −3°, —2°, −1°, and all angles therein between.

In particular, this can be achieved by the lateral interlocking elements being slightly rotatable around an axis parallel to the edge at which they connect to a different spaceframe. However, this rotation can be prevented by anchoring the lateral interlocking elements at the desired, settable angle. Note that one or both of the lateral interlocking elements (male and/or female) that are to be interlocked, can be placed at an angle with respect to their 'normal' position, wherein they allow a straight connection (parallel front frames). By setting both lateral interlocking elements at an angle, a total angle up to 30° (−30°) can be achieved.

Preferably, this is limited to at most 20° (−20°) or 15° (−15°), or even 12° (−12°). Separately, the lateral interlocking elements can be set to achieve an angle of about half of the total angle in these cases. Preferably, the total angle is achieved by each lateral interlocking element being set at an angulation of about half of the total desired angle. A particular embodiment of this can be seen in the figures, where the plurality of settable angles for both lateral interlocking elements is visible. As can be seen, whereby the lateral interlocking elements can be locked into each settable angle (although the locking pin/screw is not visible) onto the spacer element previously mentioned, thereby fixedly determining the angle between the neighboring spaceframes.

The applicant has noticed that none of the prior art systems can provide lateral coupling at angles (without severely paying in structural strength). Often, separate structures are then simply used which are placed next to each other, or coupled in an improvised fashion which is often more dangerous than not coupling them. The advantages of the proposed invention in this matter are clear, namely that the composed overlying structure remains a single unit (providing far greater stability), that a wide variety of angles can be chosen, and that these angles can be reliably set and held.

In a preferred embodiment, the first truss frame extends from the first hinge axis over at least 30% of the length of the first edge, and the second truss frame extends over at least 30% of the length of the first edge. Preferably, the first and the second truss frame extend over a length of at most 70% or even at most 60% of the length of the first edge, more preferably at most 50%. Most preferably, the length of the first and second truss frame is about 40% that of the length of the first edge, for instance 31%, 32%, 33%, 34%, 35%, 36%, 37%, 38%, 39%, 40%, 41%, 42%, 43%, 44%, 45%, 46%, 47%, 48%, 49% or values therein between. Note that higher or lower values are possible as well, such as 68%, 66%, 64%, 62%, 58%, 56%, 54% and 52%.

This embodiment is particularly useful when combined with one or more other elements, as it allows for the other elements to be placed in a position where they can be used practically, and are not in the way of the truss frames. This allows the truss frames to be folded in to a very compact structure of minimal thickness (which will be a decisive factor in transport efficiency), as no (or few, compact) other elements are present beneath the folded truss frames. The mentioned length of the truss frames (distance from hinge axis to the end of hinge arms (and optionally the connector beam) is ideally kept in the aforementioned range, as this allows lateral 'free' zones where interlocking elements can be positioned on the front frame to allow coupling to neighboring spaceframes. These interlocking elements need some space in order to allow proper (strong) fixation to the front frame, as they will need to be able to endure significant stress and forces along several directions.

In a preferred embodiment, a first of the hinge arms of the first truss frame and a first of the additional hinge arms of the first truss frame form a substantially triangular structure with a part of the first hinge axis, said first of the hinge arms and said first of the additional hinge arms being angled with respect to the first hinge axis over an angle of at least 45°, preferably at least 60°, and whereby said first of the additional hinge arms is hingedly attached to the front frame towards the middle of the first hinge axis. Furthermore, a second of the hinge arms of the first truss frame and a second of the additional hinge arms of the first truss frame form a substantially triangular structure with a part of the first hinge axis, said second of the hinge arms and said second of the additional hinge arms being angled with respect to the first hinge axis over an angle of at least 45°, preferably at least 60°, and whereby said second of the additional hinge arms is hingedly attached to the front frame towards the middle of the first hinge axis. Furthermore, a first of the hinge arms of the second truss frame and a first of the additional hinge arms of the second truss frame form a substantially triangular structure with a part of the second hinge axis, said first of the hinge arms and said first of the additional hinge arms being angled with respect to the second hinge axis over an angle of at least 45°, preferably at least 60°, and whereby said first of the additional hinge arms is hingedly attached to the front frame towards the middle of the second hinge axis. Lastly, a second of the hinge arms of the second truss frame and a second of the additional hinge arms of the second truss frame form a substantially triangular structure with a part of the second hinge axis, said second of the hinge arms and said second of the additional hinge arms being angled with respect to the second hinge axis over an angle of at least 45°, preferably at least 60°, and whereby said second of the additional hinge arms is hingedly attached to the front frame towards the middle of the second hinge axis.

The angle under which the (additional) hinge arms are positioned with respect to the hinge axis (of said specific hinge arm) can be found in a range of 45° up to 80°, such as 50°, 55°, 60°, 65°, 70°, 75°, however, preferably it is between 60° to 68°, such as 61°, 62°, 63°, 64°, 65°, 66°, 67°. The preferred range of angles allows the truss frame to provide an unfolded spaceframe with a long base, thus providing stability to the unfolded structure, while still ensuring the structural strength by having supports (the hinge arms and additional hinge arms) that extend along sufficiently different directions to properly redistribute any stress, force or pressure. Furthermore, the triangular structures formed by the combination of a hinge arm and the adjoining additional hinge arm provide a reinforced support for the locking elements with which the truss frames are secured to each other. By joining the additional hinge arms in a central hinging point at the hinge axes, the truss frames are made stronger and easier to manipulate.

In a preferred embodiment, a projection of the connector beam perpendicular to the front frame on said front frame extends from a first edge to an oppositely positioned second edge of the front frame, and whereby said connector beam comprises anterior interlocking elements on each longitudinal end, each anterior interlocking element for detachably interlocking with an anterior interlocking element of a different foldable modular spaceframe, preferably whereby the anterior interlocking element on a first of said longitudinal ends is a male anterior interlocking element, and the anterior interlocking element on a second of said longitudinal ends is a female anterior interlocking element, adapted for detachably receiving the male anterior interlocking element of the different foldable modular spaceframe.

The longitudinal connector beam provides the most anterior element of the unfolded spaceframe and thus provides a very interesting position at which the spaceframe is to be connected (coupled/interlocked) to neighboring spaceframes (above and/or below) to ensure a more stable overlying structure (connected at front frame and at the back). As is clear, in most cases opposite anterior locking elements are provided on opposite ends of the connector beam, thus allowing easy interlocking between all spaceframes, whereby one of the two opposite anterior interlocking elements will somewhat extend further beyond the front frame in order to couple with neighboring spaceframes. However, it is possible to provide 'neutral' anterior interlocking means which connect to all other 'neutral' anterior interlocking means (for instance via a separate locking component that connects the two anterior interlocking means, magnetization, . . . ).

Figure 3:
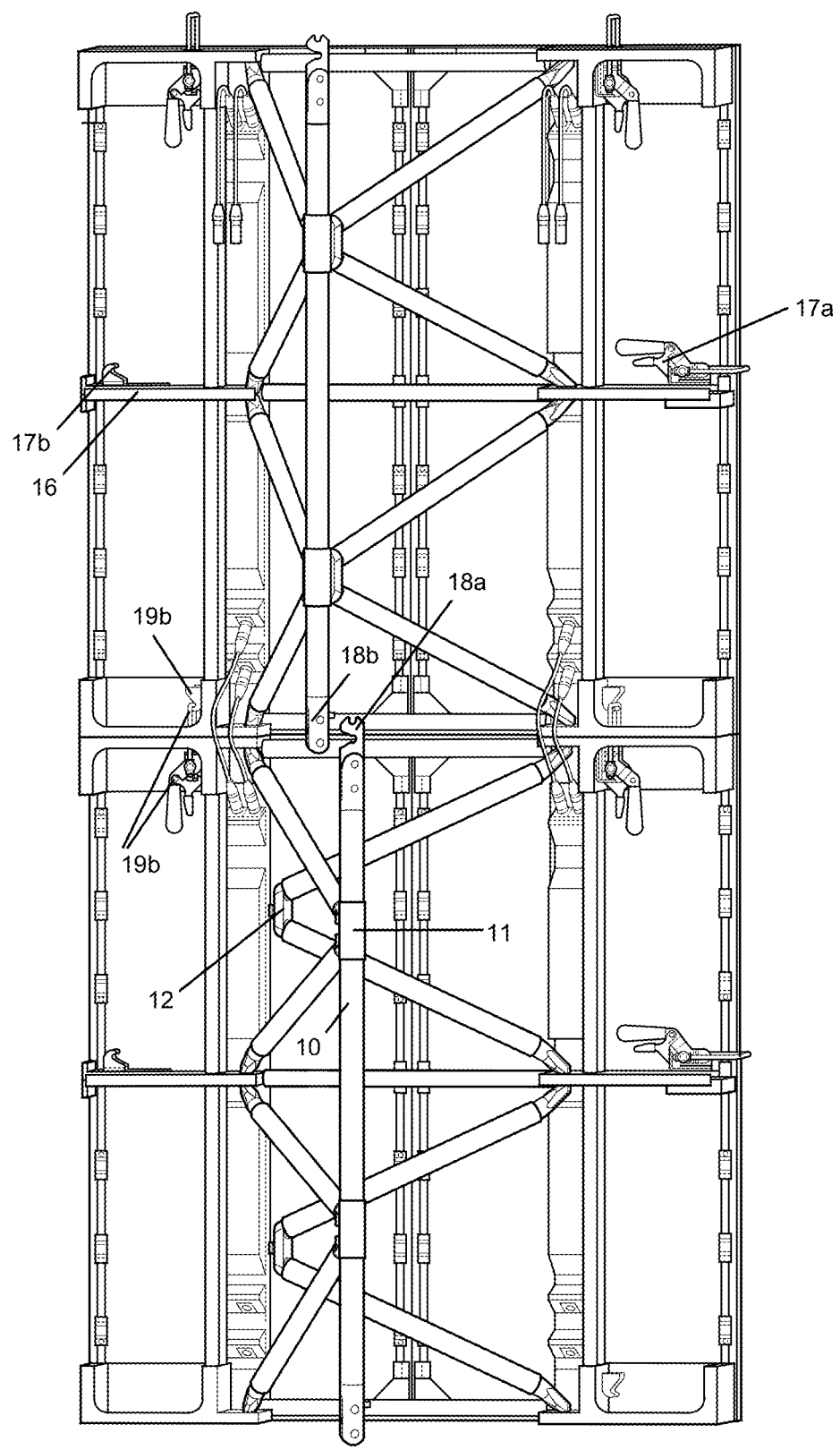
Figure 4:
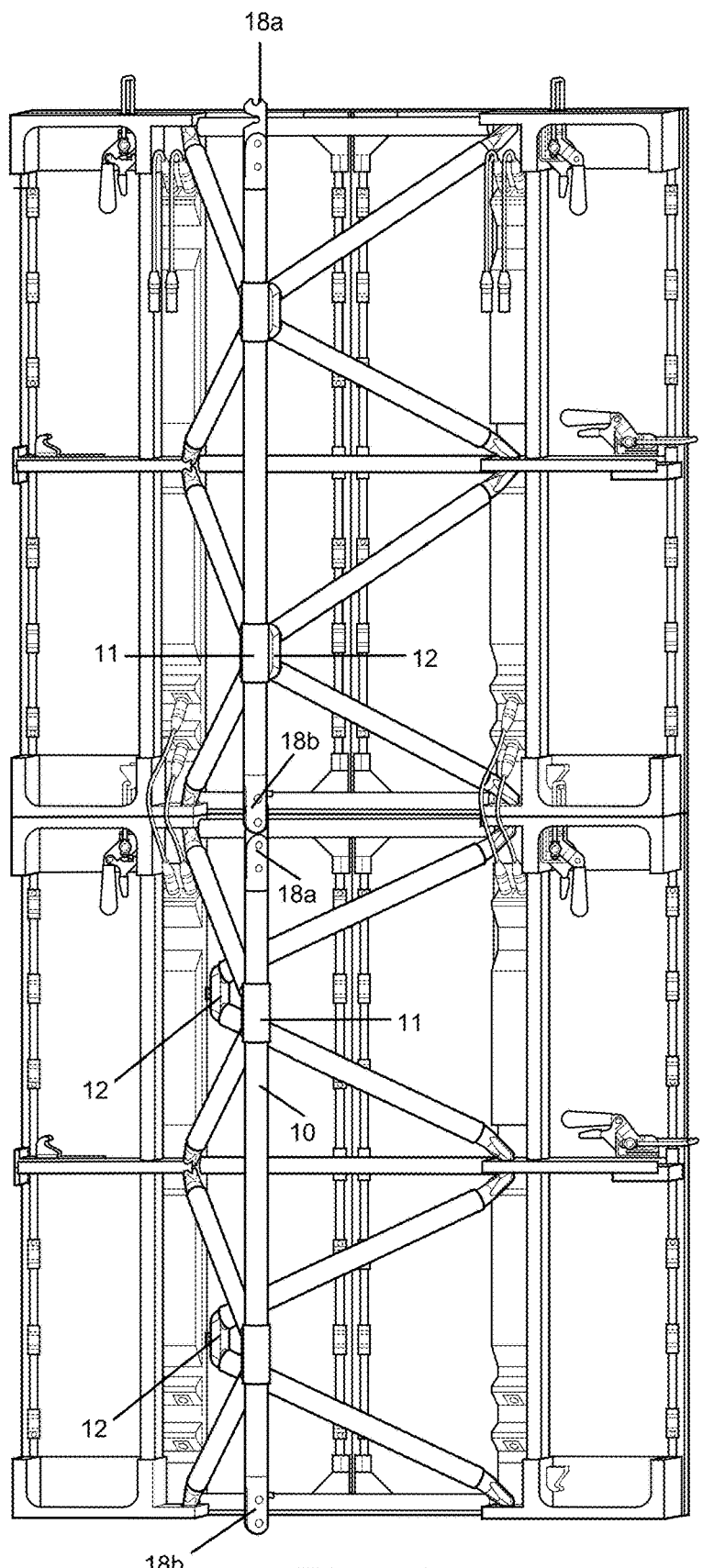
Figure 5:
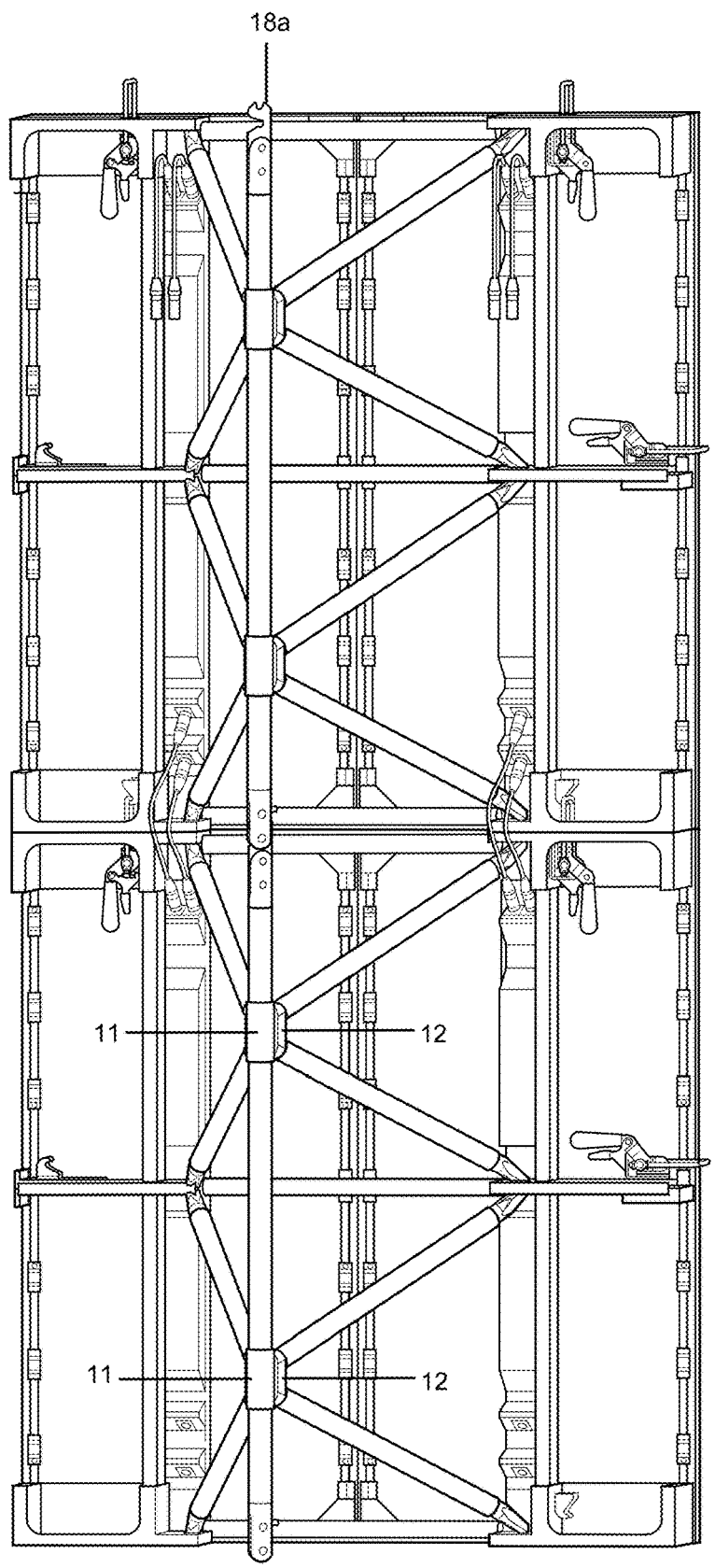
Figure 6:
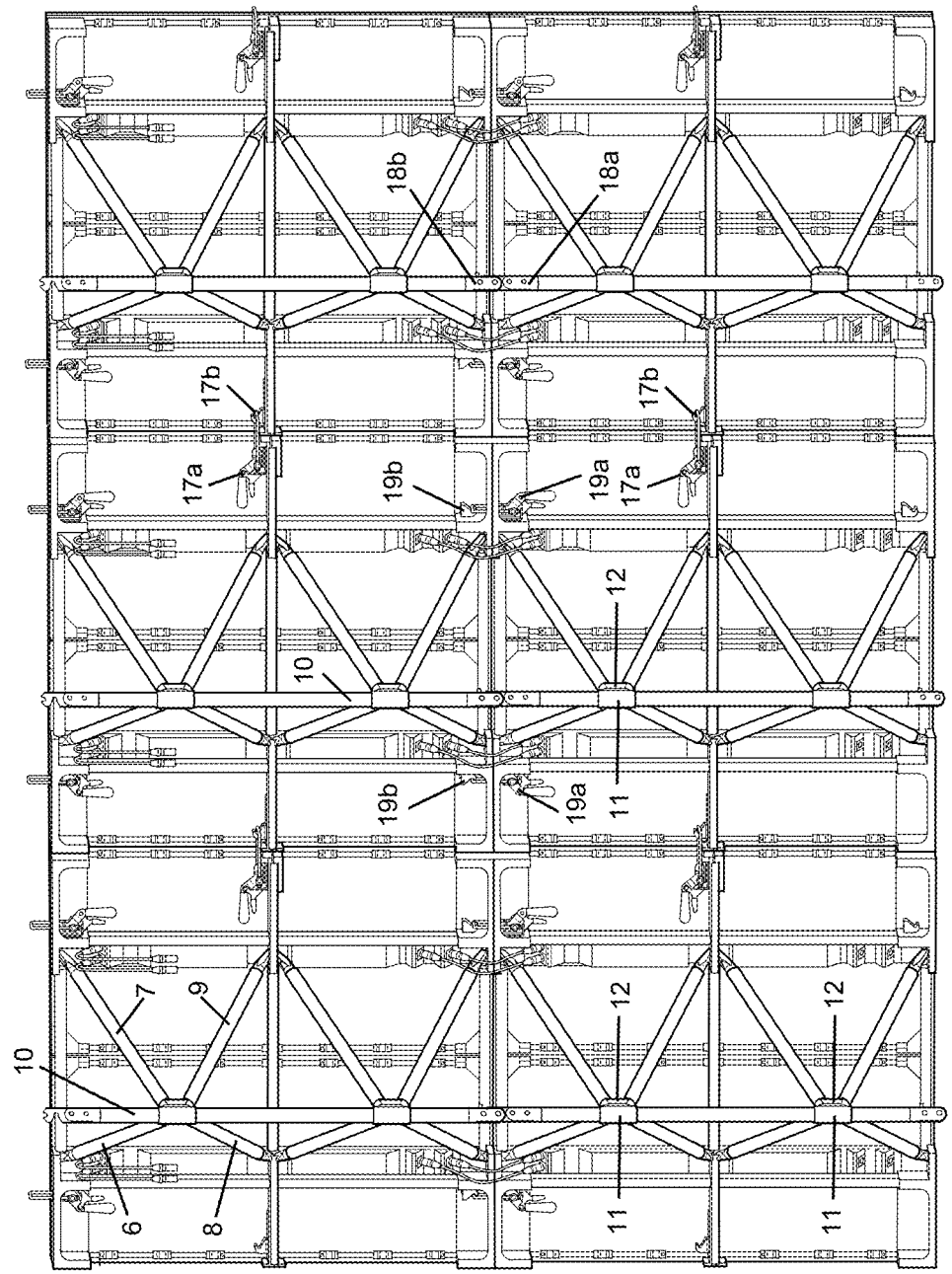
FIG. 6 shows a larger structure comprising a plurality of spaceframes according to an embodiment of the invention.

In order to clarify a particularly preferred embodiment, FIG. 3 is referred to. Herein, the preferred embodiment is shown, whereby one can see that the 'female' receiving anterior locking element of the top spaceframe (towards the middle) is able to receive the 'male' anterior locking element of the bottom spaceframe simply by folding the first truss frame of the bottom spaceframe open, thereby sliding said male anterior locking element into the female anterior locking element. These elements are shown more clearly in other Figures, such as FIG. 7, which furthermore explains the way in which they interlock. As can be seen therein, the male anterior interlocking element comprises two indents, a sideways indent and an extremal indent. The female anterior interlocking element comprises a U shaped end (a groove), which comprises a first fixed bar that is designed to be received in the sideways indent of the male anterior interlocking element when it is shifted into the groove. At this point, the top of the male anterior interlocking element pushes up a second bar which can be moved up and down to some extent along the axis of the connector beam (typically, only a few mm up to a few cm will be necessary), which then falls into the extremal indent of the male anterior interlocking element, thereby fixedly securing its position. Note that the first bar prevents the male anterior interlocking element to push the second bar upwards to unlock it, and that the second bar prevents the male anterior interlocking element to shift out of the groove. A protrusion is present on said second bar, which allows a user to manipulate the second bar (along the axis of the connector beam), in this case, pushing it upward in order to unlock the anterior interlocking elements (for instance, when dismantling the spaceframe structure). Note however that this in no way restricts the invention to the shown embodiment.

In a further preferred embodiment, said first edge and said second edge furthermore comprise a longitudinal interlocking element towards each end (corner) of said first and second edge, said longitudinal interlocking element being suitable for detachably interlocking with an longitudinal interlocking element of a different foldable modular spaceframe, preferably whereby the longitudinal interlocking elements on the first edge are male longitudinal interlocking elements and the longitudinal interlocking elements on the second edge are female longitudinal interlocking elements, adapted to detachably receiving a male longitudinal interlocking element of the different foldable modular space frame.

By coupling the spaceframe to overhanging and underhanging spaceframes at both ends, this connection is secured, which is crucial as typically great weights need to be supported along this axis. As mentioned before, typically the longitudinal interlocking elements at one edge will be 'opposite' to those at the opposite edge to ensure all spaceframes can be easily coupled to each other. However, a staggered configuration is also possible (male on top left, female on bottom left, female on top right, male on bottom left, or the other way around).

In a further preferred embodiment, the spaceframe comprises a number of reinforced corner elements, attached to the back of the polygonal spaceframe to the corners thereof, whereby the hinge arms of the first and the second truss frames are hingedly connected to the front frame at said reinforced corner elements, and whereby the longitudinal interlocking elements are integrated in the reinforced corner elements.

Preferably, the reinforced corner elements of at least one edge are adapted to have a 'longitudinal' opening (along hinge axes) towards a neighboring spaceframe. This allows the longitudinal interlocking elements of the neighboring spaceframe to be directed perfectly towards the matching longitudinal interlocking element of the first spaceframe, and vice versa.

These reinforced corner elements in a first point protect the spaceframe at its corners, which can be vulnerable to damage, be it in transport or during handling. Additionally, they provide excellent anchoring points for the longitudinal interlocking elements.

In a further preferred embodiment, the longitudinal interlocking elements on the first edge each comprise a latch clamp, and whereby the longitudinal interlocking elements on the second edge each comprise a latch, whereby said latch clamp is suitable for detachably clamping a latch of a different foldable modular spaceframe, and whereby said latch is suitable for being detachably clamped by a latch clamp of a different foldable modular spaceframe, preferably whereby said latch clamp is positioned to be closed via application of a force on the latch clamp substantially toward a central region of the spaceframe and/or of the first edge, and substantially parallel to the front frame. This can be seen more clearly in the Figures. The latch clamp could also be of a more general toggle clamp type or others. Preferably, the latch clamp is a pull-action latch clamp, examples of these are the Destaco® U and J-hook types.

The advantages of this system have been described previously. As mentioned, when the reinforced corner elements have an opening, this can be used to guide the longitudinal interlocking elements to their proper match on the neighboring spaceframe.

In a preferred embodiment, the spaceframe is substantially rectangular, preferably square with sides comprised between 50 cm and 250 cm. More preferably, the sides' length is comprised between 75 cm and 175 cm, most preferably between 100 cm and 150 cm. Possible lengths are 80 cm, 85 cm, 90 cm, 95 cm, 100 cm, 102 cm, 104 cm, 106 cm, 108 cm, 110 cm, 112 cm, 114 cm, 116 cm, 118 cm, 120 cm, 122 cm, 124 cm, 126 cm, 128 cm, 130 cm, 132 cm, 134 cm, 136 cm, 138 cm, 140 cm, 145 cm or 150 cm, or any values therein between. Greater lengths cause the spaceframe to become difficult to manipulate, while smaller spaceframes are too cumbersome in setting up and dismantling. The proposed spaceframes will be suitable for manipulation by a single person, while being of low enough weight to be carried by one person as well. Said weight is preferably comprised between 15 kg and 70 kg, more preferably between 25 kg and 50 kg, most preferably between 30 kg and 40 kg.

The spaceframes is furthermore adapted to have a thickness lower than 150 mm in a folded position, preferably lower than 135 mm and more preferably lower than 120 mm. Most preferably, it is about 110 mm, although slightly deviating values are possible of course, such as 100 mm, 95 mm, 90 mm, 105 mm, 115 mm, and all values therein between.

The hinge arms (and additional hinge arms) preferably have a radius comprised between 1 cm and 4 cm, preferably between 2 cm and 3 cm, such as 2.1 cm, 2.2 cm, 2.3 cm, 2.4 cm, 2.5 cm, 2.6 cm, 2.7 cm, 2.8 cm, 2.9 cm or values therein between. The proposed thickness, in combination with good material choice will ensure that the arms are sufficient to withstand the necessary forces and pressures without breaking (or bending).

The spaceframes preferably have a 'thickness' in an unfolded position of at least 40 cm, preferably at least 45 cm and most preferably of about 50 cm, however, deviating values are possible, such as 42 cm, 44 cm, 46 cm, 47 cm, 48 cm, 49 cm, 51 cm, 52 cm, 53 cm, 54 cm, 55 cm, 60 cm, 70 cm, 80 cm, 100 cm, and all values therein between.

In a preferred embodiment, the truss frames comprise carbon, as this will greatly reduce the weight of the spaceframe, while maintaining the structural strength. Furthermore, the locking elements preferably comprise aluminum or an alloy thereof, and are connected to the rest of the structure via bicomponent adhesives to attach the different material to each other. Additionally, other interlocking elements, the corner elements, the spacer element and others may be of aluminum or a component thereof.

In a second aspect, the invention provides a method for constructing a modular wall structure from a plurality of foldable spaceframes, said spaceframes being as described in this document, comprising the following steps:

a. providing two or more sets each of two or more the folded spaceframes, whereby said spaceframes are aligned and positioned substantially vertically, whereby the first and the second hinge axes are positioned substantially vertical, preferably whereby each set is provided on a dolly adapted for holding the spaceframes, more preferably adapted for holding the spaceframes in the sets over a regular distance from each other;

b. unfolding a first spaceframe from at least two or more of the sets, by unfolding the first truss frame, unfolding the second truss frame and interlocking the first truss frame with the second truss frame at the longitudinal connector beam of the first truss frame;

c. laterally interlocking the unfolded spaceframes with neighboring unfolded spaceframes, thereby creating a row of laterally interlocked spaceframes;

d. lifting the row of laterally interlocked spaceframes vertically to a position hanging closely above the sets of the remaining spaceframes;

e. repeating steps b and c on the sets of the remaining spaceframes, thereby creating a new row of laterally interlocked spaceframes;

f. vertically interlocking the new row of laterally interlocked spaceframes to the row of laterally interlocked spaceframes hanging closely above the new row;

g. lifting the vertically interlocked rows of laterally interlocked spaceframes vertically to a position hanging closely above the sets of the remaining spaceframes;

h. optionally repeating steps b to g one or more times.

The advantages of the spaceframes have been discussed in previous sections. However, the invention also prevents a significant improvement in the method of setting up larger constructions. As shown in the Figures, specifically FIG. 12A-K, and additionally FIG. 2-5, it allows for the fast and easy construction of larger structures with the spaceframes of the invention.

Preferably, by providing the spaceframes in an orderly fashion, in sets, these can easily be linked up laterally (once the dollies have been manipulated and cushioning elements and such have been removed), by simply laterally interlocking the spaceframes of the first row with each other with the lateral interlocking elements. This can be done before or after unfolding these spaceframes.

An important following step is that this first row is lifted upwards, the way in which this lifting is executed is not significant, only that a sufficient strength can be provided by the lifting means. Furthermore, it is to be noted that the spaceframes typically will have one or more male interlocking elements pointing upwards for easy interlocking with the lifting means. Once this row has been lifted, it is presented slightly above the following row of the remaining spaceframes. Again, these are laterally interlocked and unfolded as before and are interlocked with the overhanging structure, preferably both via the anterior interlocking elements and the longitudinal interlocking elements. Note that in some embodiments (as in the one shown), anterior locking is executed during the unfolding. Once vertically (or longitudinally) interlocked, they are lifted upwards, so the bottom row of lifted spaceframes is again overhanging with respect to the first row of the remaining spaceframes, after which the process is repeated.

The actions necessary to perform this construction are kept to a bare minimum, while maintaining high structural strength. In the shown embodiment, laterally interlocking the spaceframes costs two actions in this case. Unfolding costs 6 actions, though two can be done at a time (unfolding the first and second truss frame per spaceframe). Vertical or longitudinal interlocking costs 9 actions, however 3 have been executed during unfolding (as can be seen in FIG. 2-5, the anterior interlocking takes place during the unfolding) and the other 6 can be done two at a time (longitudinal interlocking elements).

In a preferred embodiment, the spaceframes are provided in a position wherein the first edges comprising the latch clamps faces upwards, whereby said latch clamp is positioned to be closed via application of a force toward a central region of the first edge and substantially parallel to the front frame, and the steps of vertically interlocking the new set to the set hanging closely above the new set, are executed by closing the latch clamps of the new set, thereby clamping the latches of the set hanging closely above the new set, whereby closing the latch clamps is preferably executed by applying a force on the latch clamps towards a central region of the spaceframe and/or the first edge thereof, and substantially parallel to the front frame of the spaceframe.

It is furthermore to be noted that any and all of the methodologies discussed concerning the spaceframes, can be applied as part of the methods for constructing the larger structures.

The invention is further described by the following non-limiting embodiments which further illustrate the invention, and are not intended to, nor should they be interpreted to, limit the scope of the invention.

The present invention will be now described in more details, referring to examples that are not limitative.

EMBODIMENTS

Example 1: Connection of Two Spaceframes

Figure 11A:
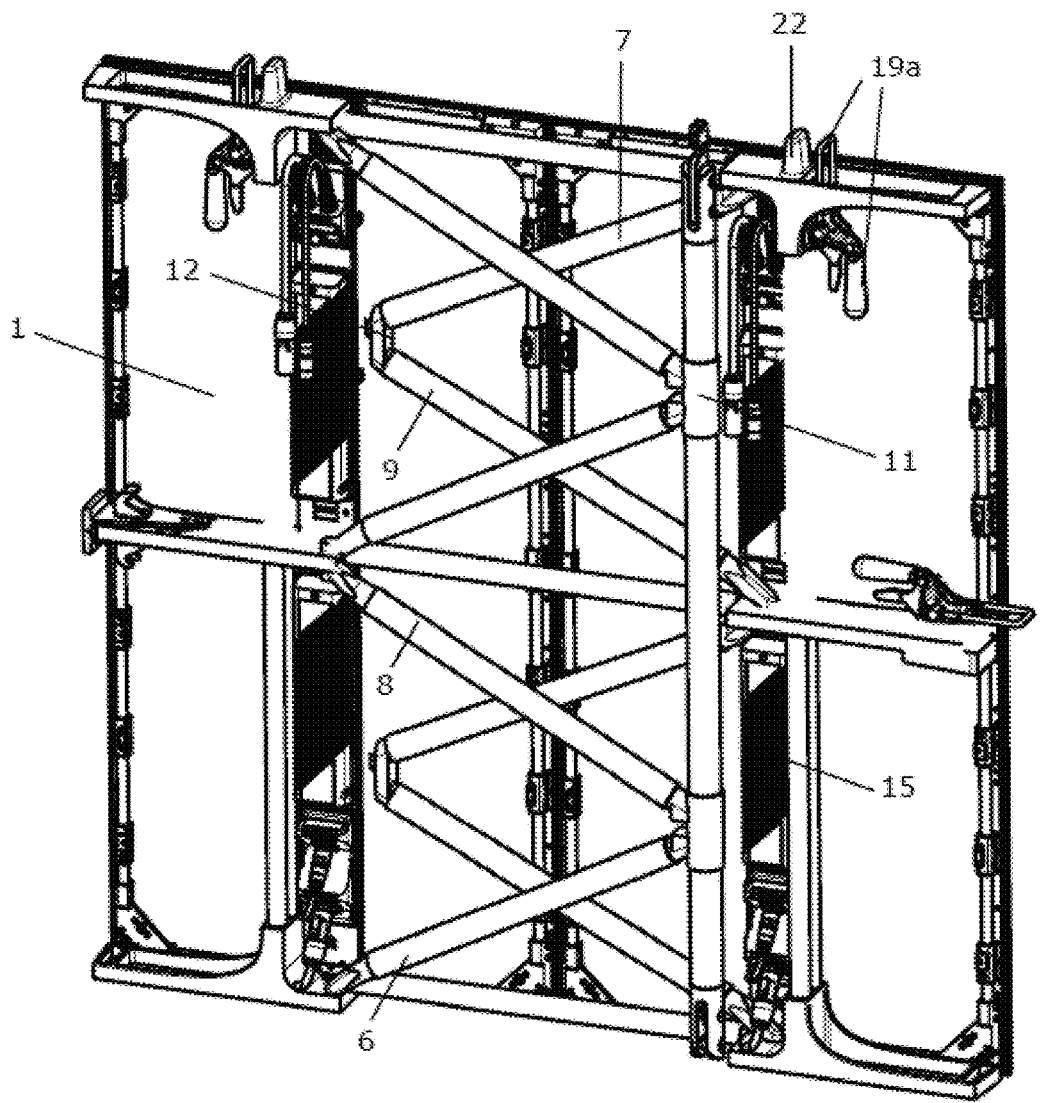
Figure 11A:
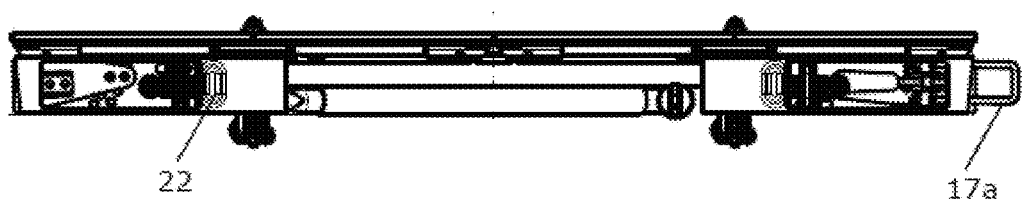
Figure 11B:
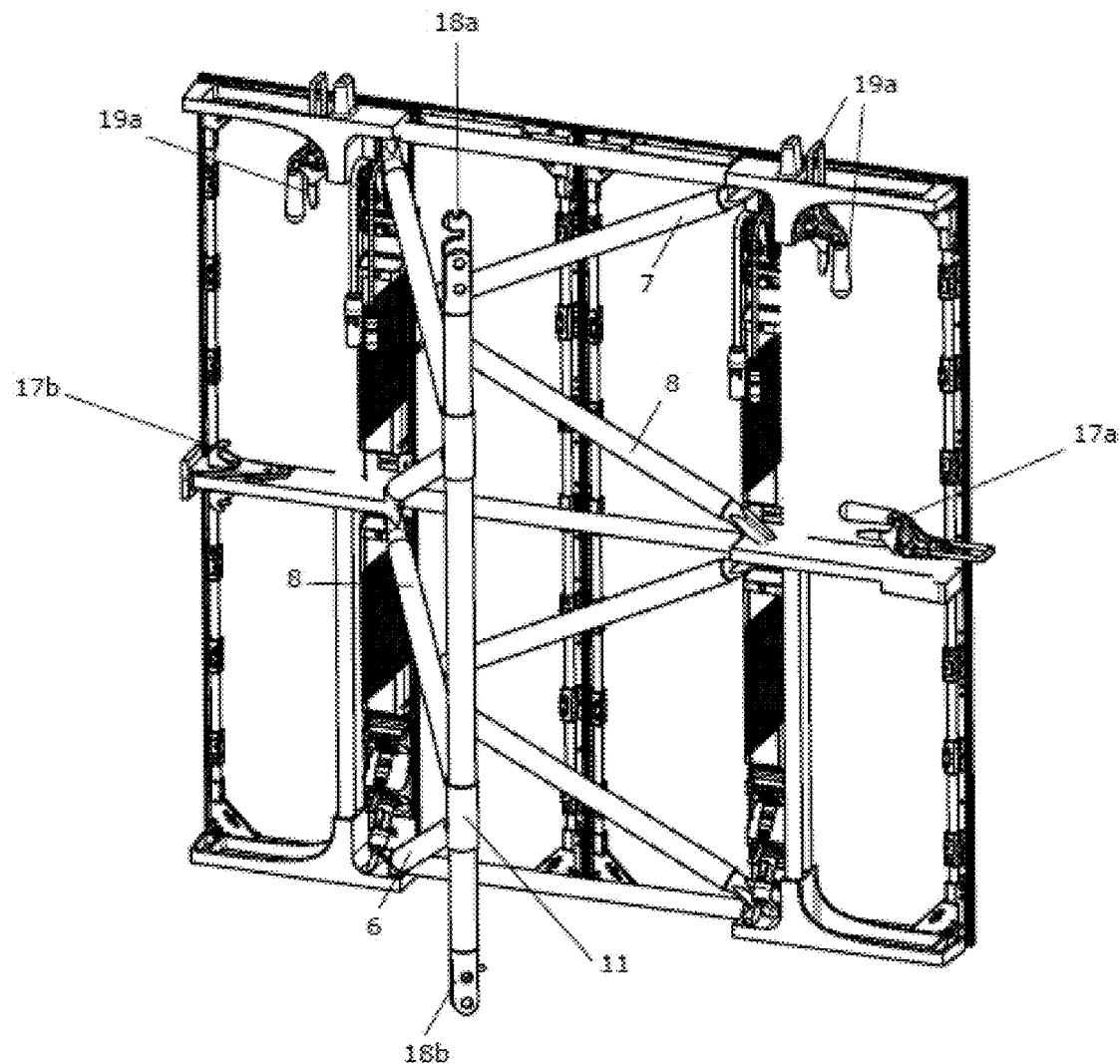
Figure 11B:
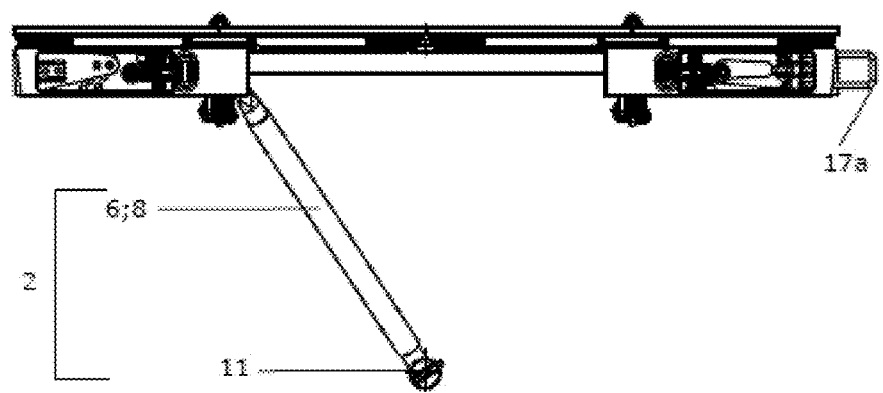
Figure 11C:
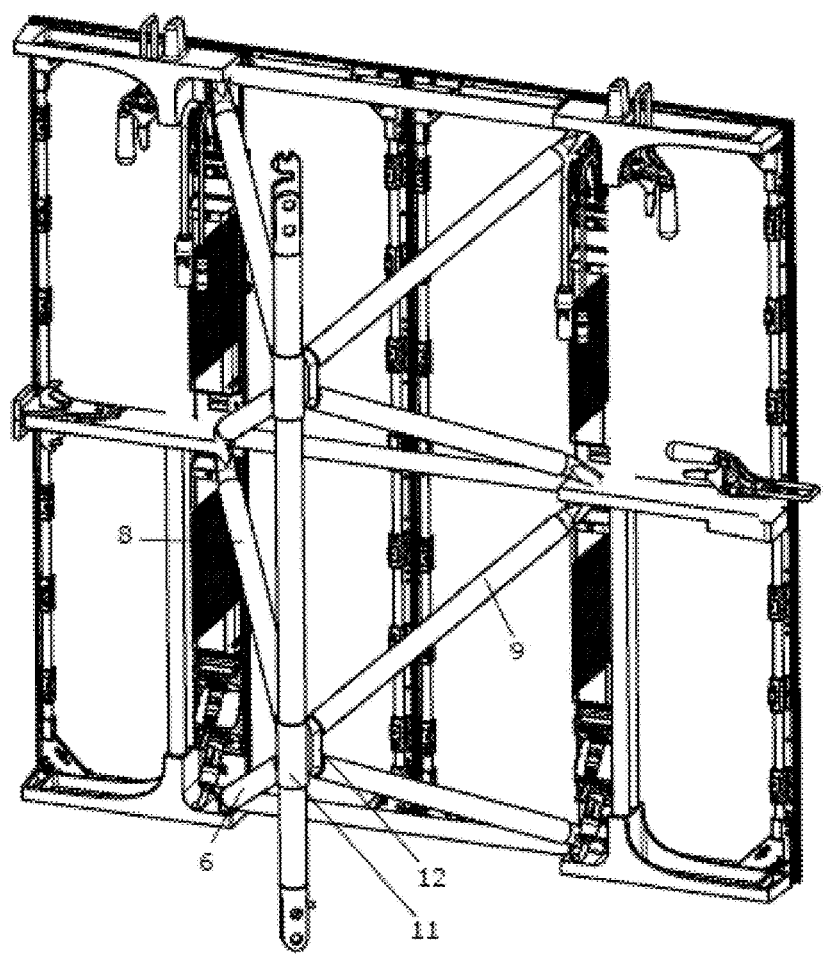
Figure 11C:
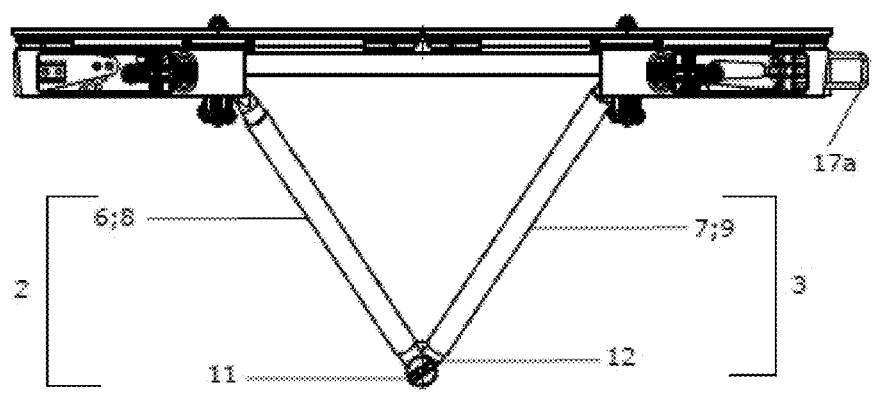

The set-up and connection of two spaceframes according to a preferred embodiment of the invention is shown in FIG. 2-5 (and in FIG. 1). In FIG. 1, the compact folded spaceframe is shown, comprising a front frame (1) with two folded-in truss frames, a first (2) and a second (3), shown more clearly in FIGS. 11B and 11C. The first truss frame (2) comprises two hinge arms (6) and two additional hinge arms (8), hingedly connected to the front frame (1), in the case of the hinge arms (6) to a corner element (20), in turn attached to the front frame (1), or in the case of the additional hinge arms (8), to a spacer element (16) of the front frame (1). As can be seen, a number of power management systems (15) are provided along the hinge axes (4, 5) of the truss frames at the back of the front frame, towards the closest parallel edge.

In this embodiment, a display panel is already provided to the front frame, and a number of cables or cable connections are visible as well. Note that the hinge axes are substantially parallel to the third (14*a*) and fourth edge (14*b*), and perpendicular to the first (13*a*) and second edge (13*b*). Furthermore, the connector beam (10) connects the ends of the arms (6, 8) of the first truss frame (2), and comprises a number of locking elements (11). Additionally, the ends of the arms (7, 9) of the second truss frame (3) comprises a number of locking elements (12). The lateral interlocking elements (male 17*a*, female 17*b*), in this case latch clamp and latch, are supported by the spacer element (16) at about the middle of the third and fourth edges. Note that the hook of the latch clamp (17*a*) slightly protrudes from the frame of the spaceframe in order to hook around the latch of a neighboring spaceframe. At the ends of the connector beam (10), the anterior interlocking elements (male 18*a*, female 18*b*) are shown, which are discussed in a further embodiment, again with the male anterior interlocking element (18*a*) slightly protruding. The longitudinal interlocking elements (male 19*a*, female 19*b*), in this case latch clamp and latch (with hook of latch clamp protruding), are supported by the reinforced corner elements (20) which serve a two-fold function, strengthening the corners of the spaceframe and providing a stable support for the interlocking elements (19*a*, 19*b*).

Figure 2:
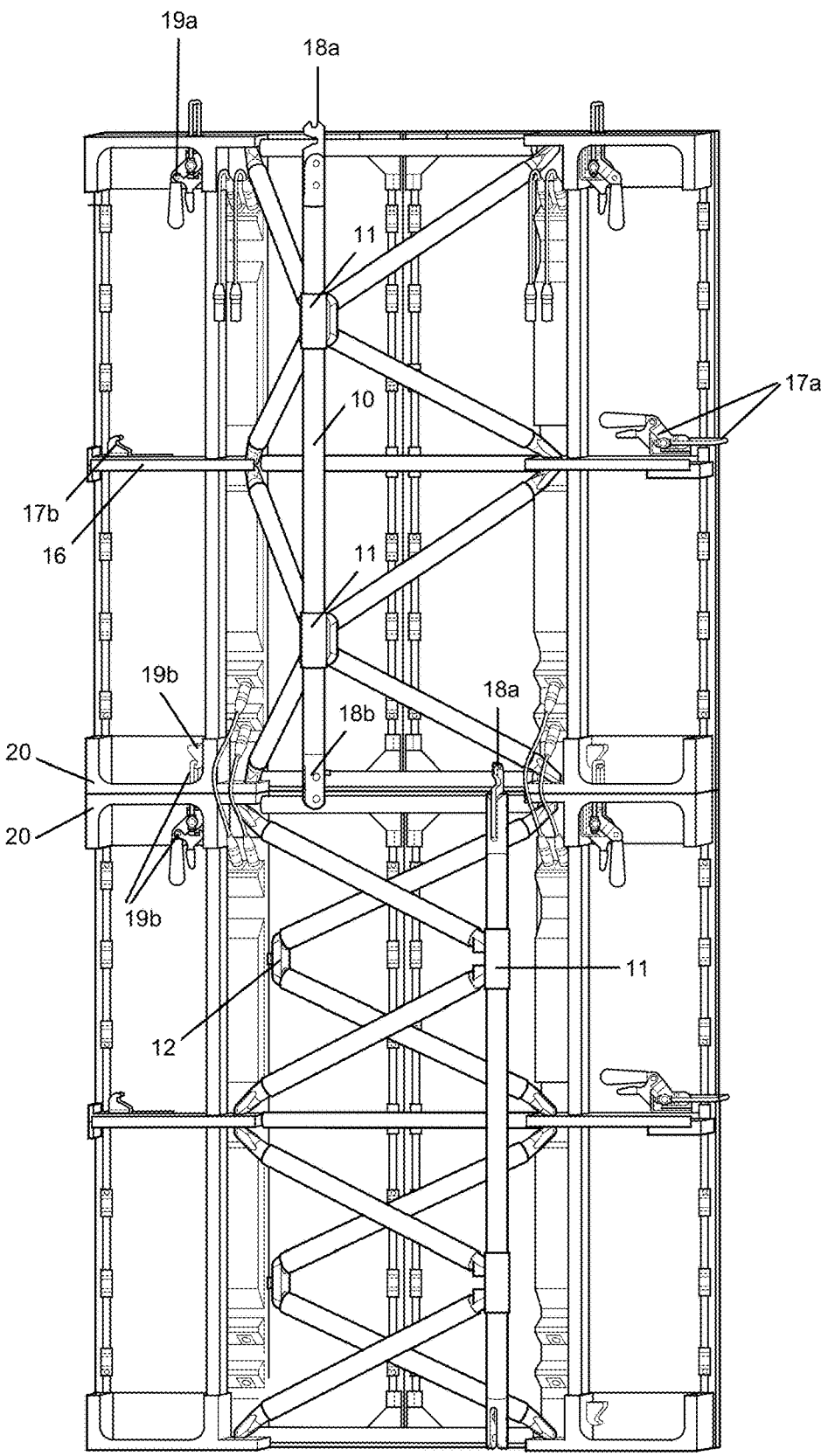
FIGS. 2, 3, 4 and 5 show an embodiment of two coupled spaceframes according to the invention, in various stages of anterior coupling.

In FIG. 2, the top spaceframe has been unfolded, and the truss frames (2, 3) have been connected at the locking elements (11, 12). Furthermore, as can be seen more clearly on the right longitudinal interlocking elements (19*a*, 19*b*), the spaceframes have been connected by the hook of the latch clamp (19*a*) of the lower spaceframe, hooking behind the latch (19*b*) of the above spaceframe. In a next step in FIG. 3, the first truss frame (2) of the lower spaceframe is unfolded, and one can clearly distinguish the male anterior interlocking element (18*a*) of the lower spaceframe aligning with the female anterior interlocking element (18*b*) of the upper spaceframe, which comprises a groove for receiving said male anterior interlocking element (18*a*). As the first truss frame (2) of the lower spaceframe is further unfolded, the male anterior interlocking element (18*a*) is introduced into said groove, and they are fixedly attached. This attachment and disengaging is discussed in a further embodiment 3. Lastly, the second truss frame (3) of the lower spaceframe is unfolded and is secured to the first truss frame (2) via the locking elements (11, 12).

The locking elements (11, 12) are preferably secured by the locking element (12) of the second truss frame 'clicking' into the locking element (11) of the first truss frame, whereby these can only be disengaged via a purposeful action, releasing the secured locking elements (11, 12). An embodiment of this is via the use of a skewing spring pin in one of the locking elements, preferably that of the second truss frame, which spring pin is pushed down slowly via the skewing profile and then release into a receptacle of the other locking element. Since the profile on the other side of the spring pin is abrupt, it cannot be pushed back in without applying a force along the axis of the spring pin, which requires a deliberate action, thereby protecting the construction from unintentionally disengaging.

The opposite side of the frame, such as frame 1, includes mounting structure for holding a panel. The panel which is held by the frame can be any type of panel, e.g., preferably a digital display panel, attached to the frame.

Example 2: Set-Up Method

FIG. 12A-K show an embodiment of the method to set up a larger structure with the spaceframes of the invention. Note that this methodology could be used for other spaceframes as well, and therefore should not be considered limited to only the spaceframes of the invention however.

Figure 12A:
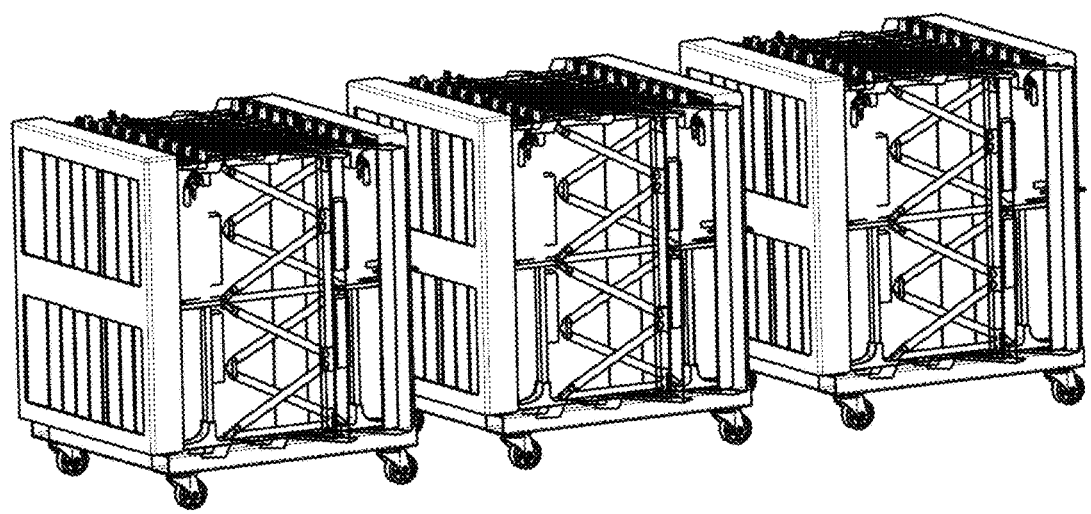
FIGS. 12A-K show a possible method for constructing larger structures with the spaceframes of the invention.
Figure 12B:
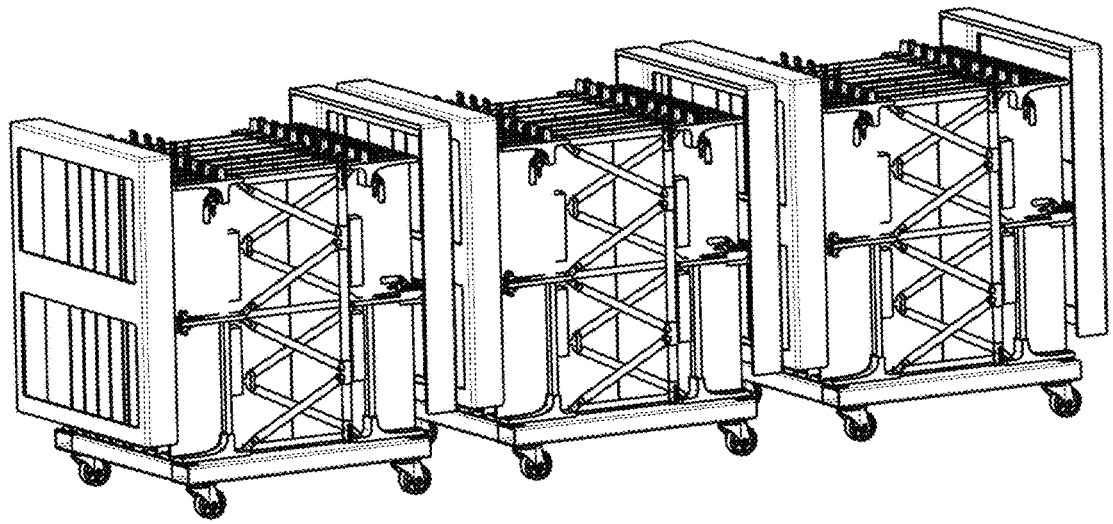
Figure 12C:
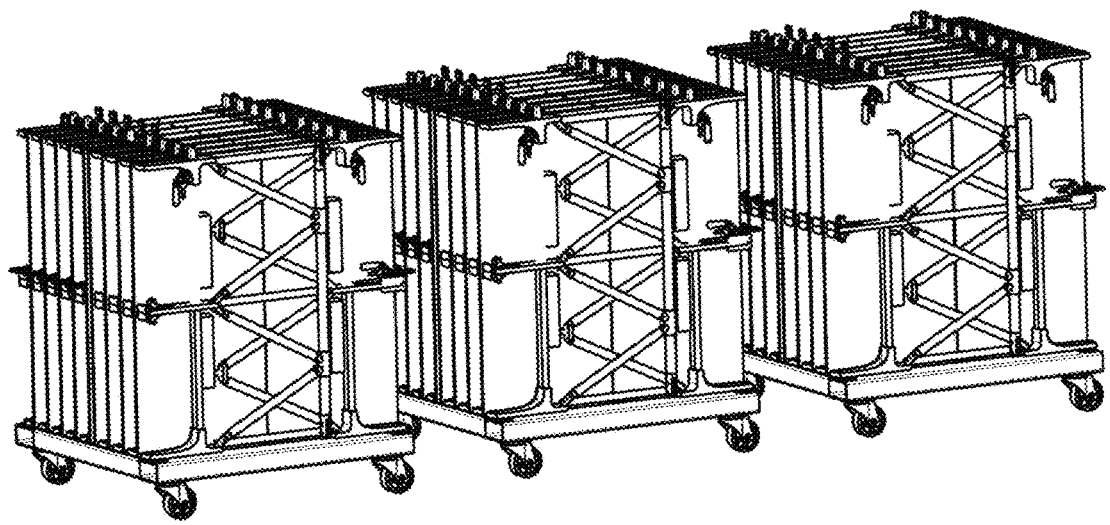
Figure 12D:
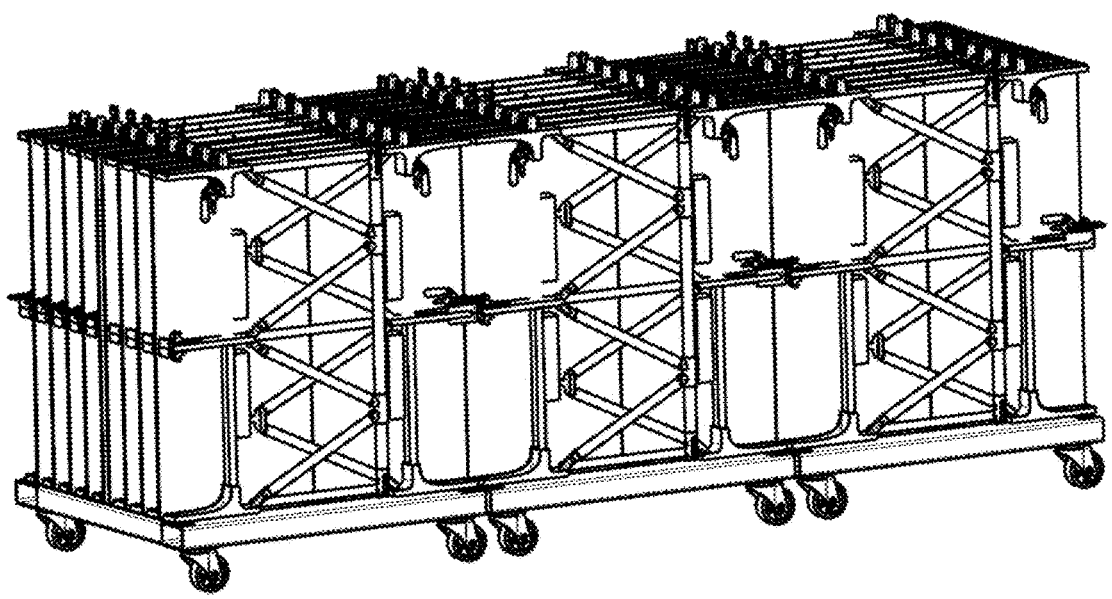
Figure 12E:
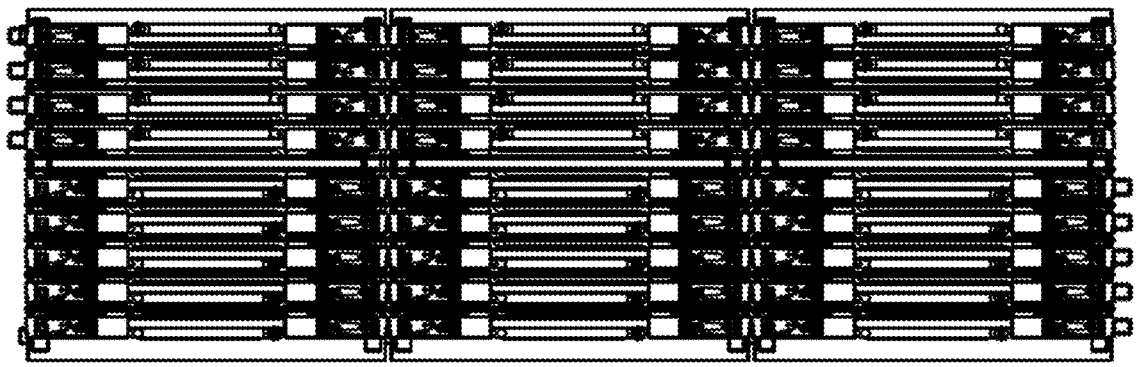
Figure 12F:
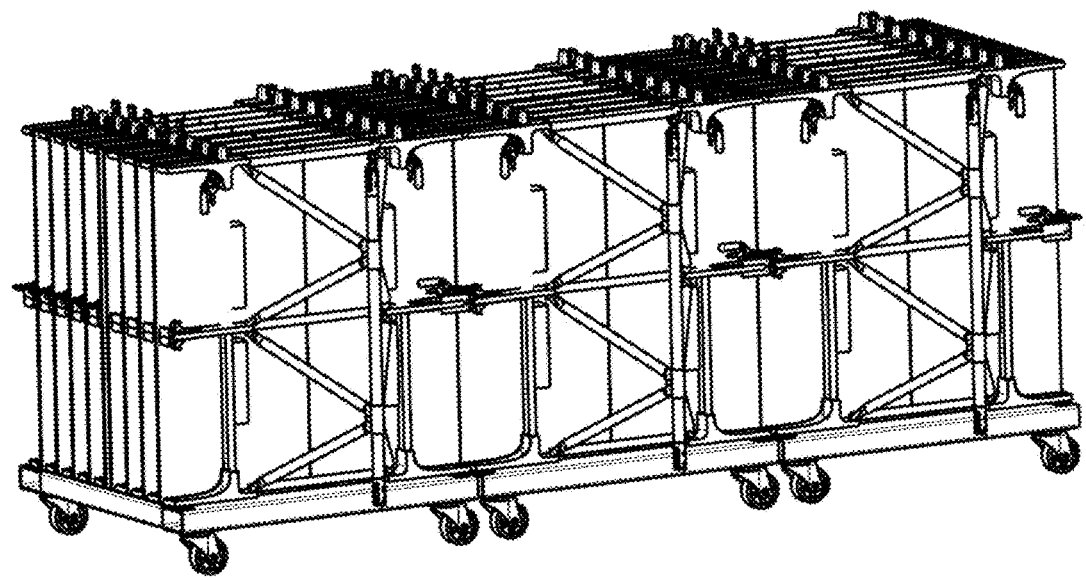
Figure 12G:
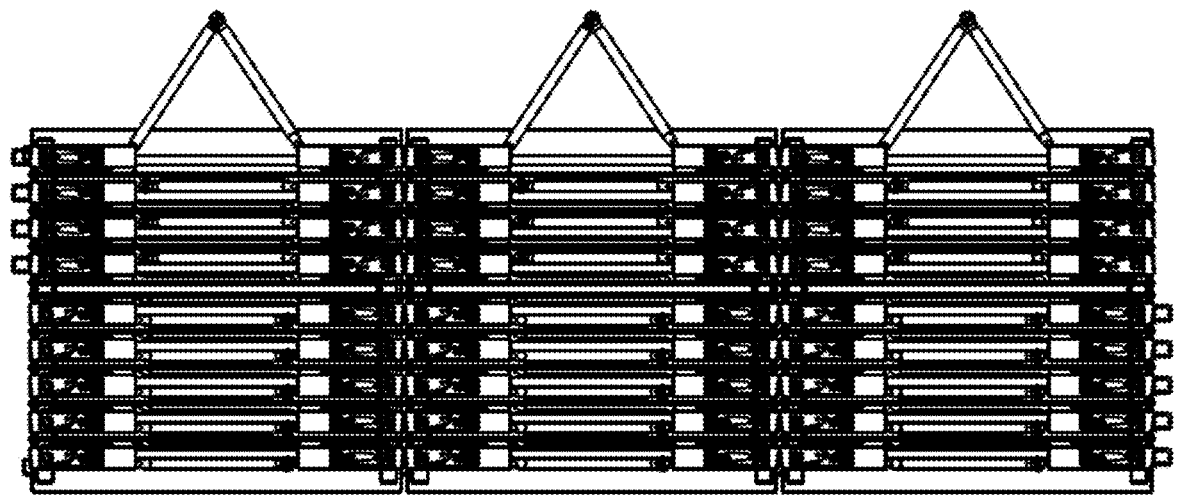

Typically, spaceframes are transported in freight vehicles (trucks, planes, boats) in dollies with sets of spaceframes, which can easily be moved during set-up. FIG. 12A to 12C show the dollies being dismantled somewhat to allow free movement of the spaceframes. Preferably, these are anchored towards their base to the dolly so they remain fixed even when the sides of the dolly are removed. In FIGS. 12D and 12E, the dollies can be seen to be moved adjacently, at which point the spaceframes can be joined laterally (via the lateral interlocking elements). In FIGS. 12F and 12G, the first row of laterally interlocked spaceframes are unfolded and the truss frames are interlocked. Note that this step may be executed before the spaceframes are laterally interlocked however.

Figure 12H:
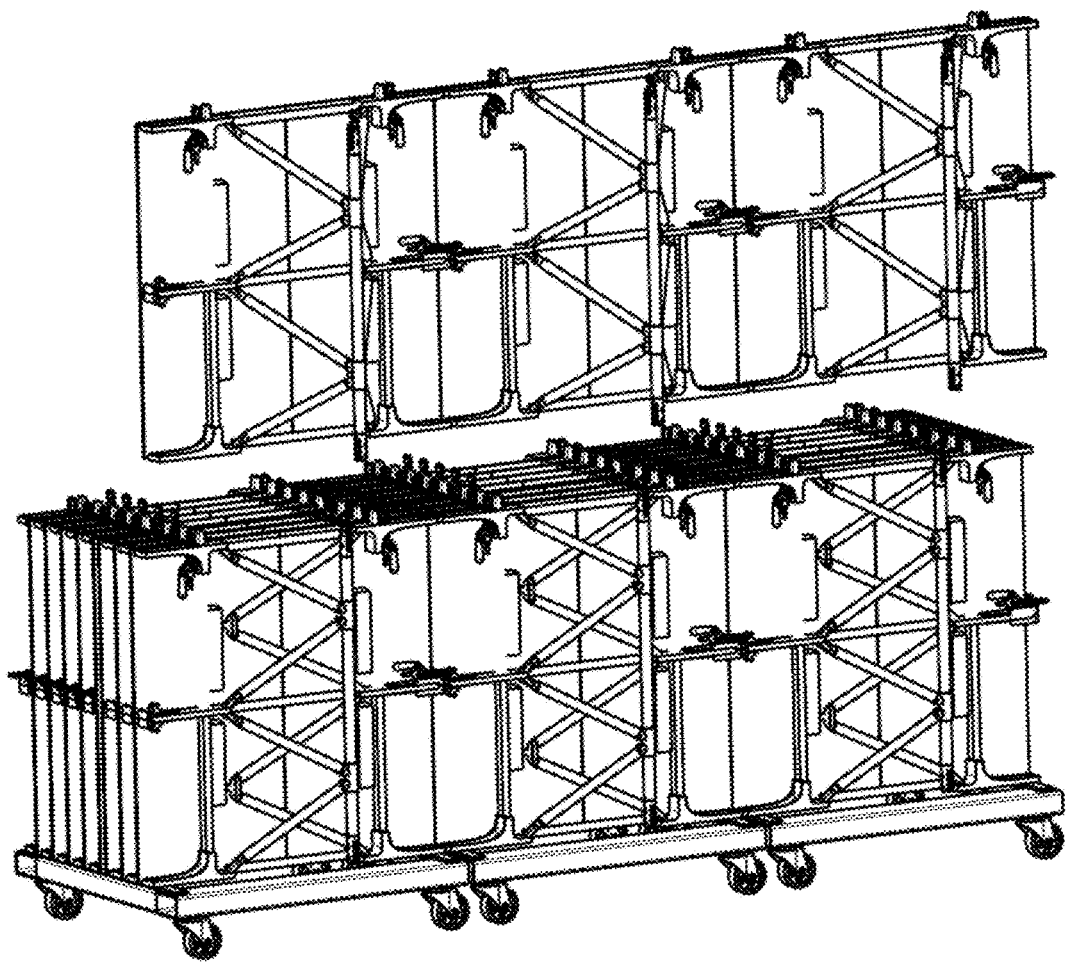
Figure 12I:
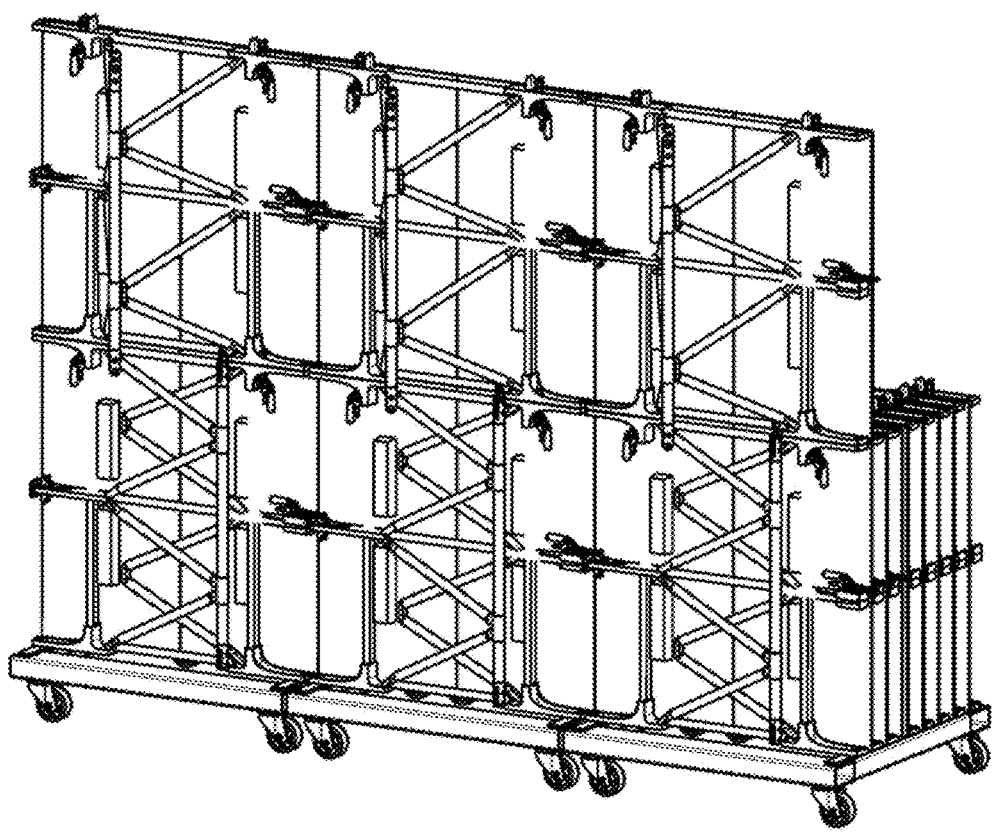
Figure 12J:
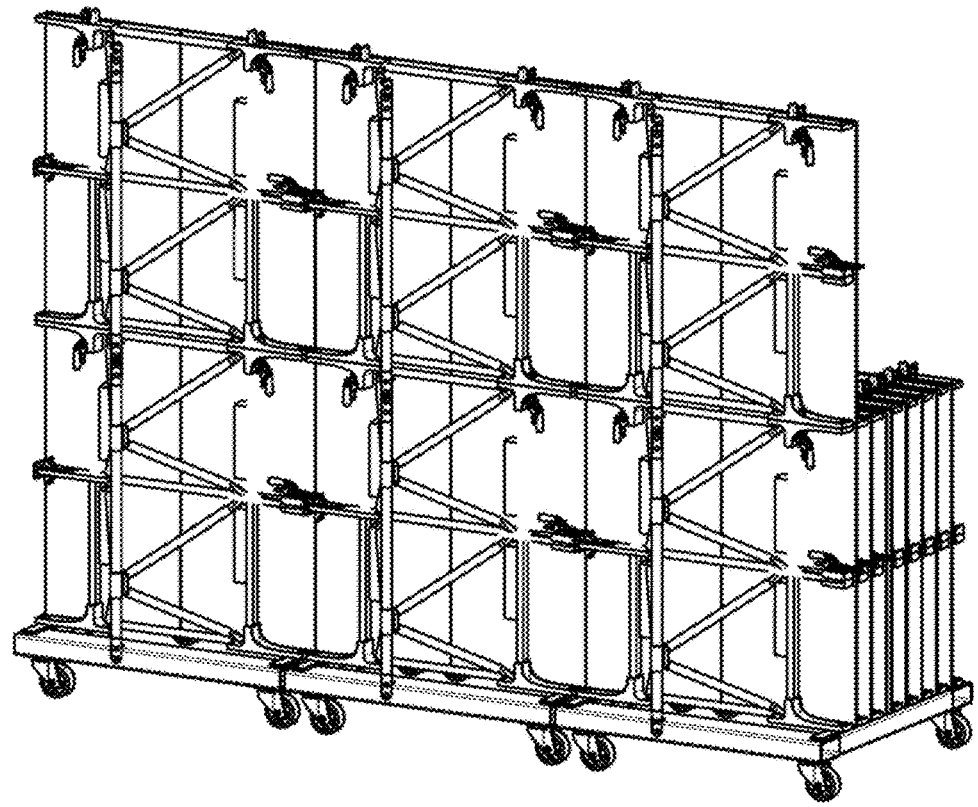
Figure 12K:
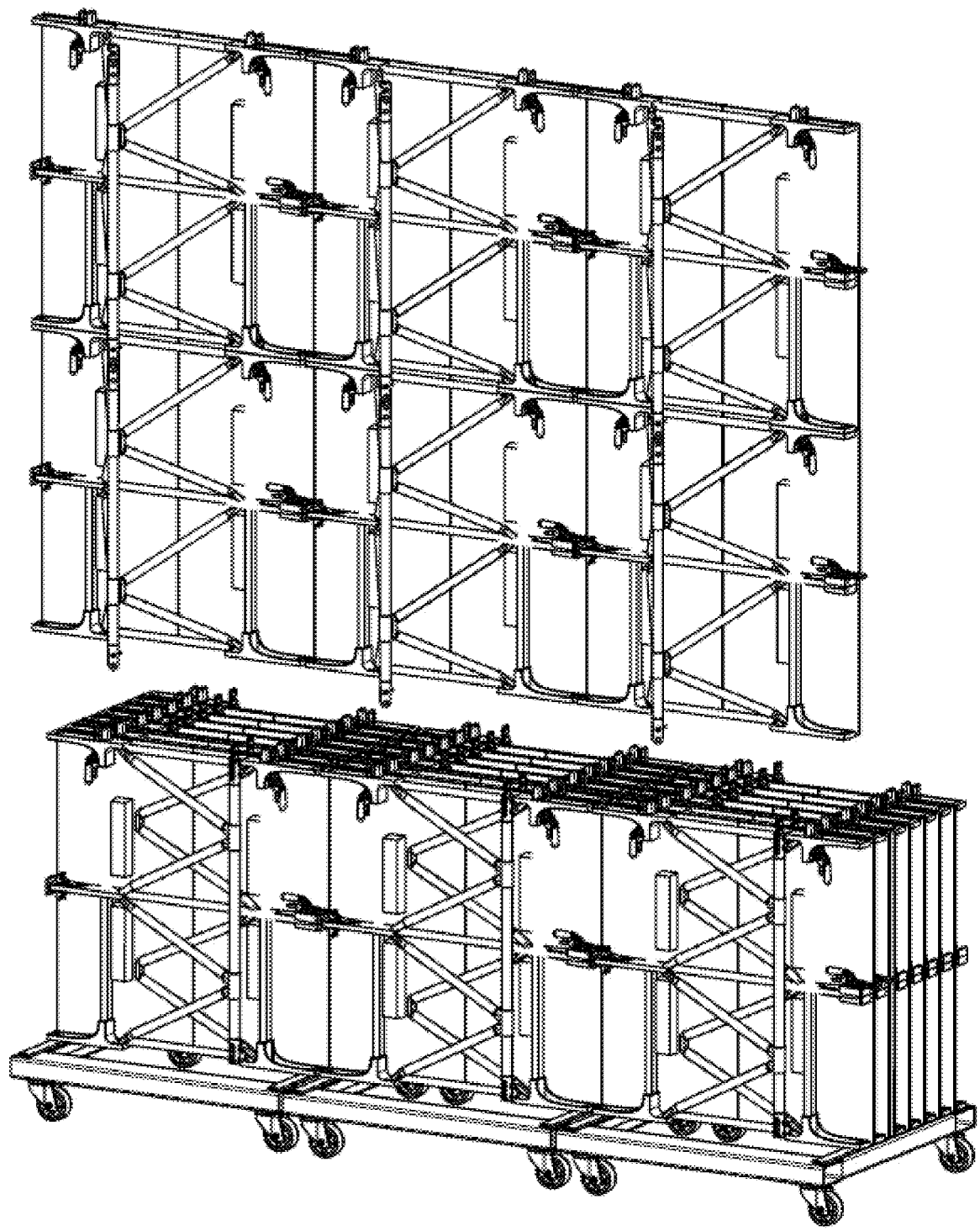

Following to these steps, the newly created row of laterally interlocked unfolded spaceframes is lifted upwards to hang slightly above the remaining spaceframes, particularly above the new first row of spaceframes, as seen in FIG. 12H. At this point, the new first row of spaceframes is vertically interlocked (in this case via the longitudinal interlocking means) as seen in FIG. 12I, followed by the unfolding of the new first row of spaceframes (FIG. 12J). It is furthermore to be noted, as mentioned previously, that the unfolding included further vertical interlocking via the anterior interlocking elements sliding into each other (see further embodiment 3).

Once completed, the vertically interlocked rows of unfolded spaceframes are lifted further upwards (FIG. 12K), hanging slightly above the new first row of spaceframes remaining in the sets on the dollies, after which the process begins again with the vertical interlocking, unfolding (and possibly further vertical interlocking), once more ending in the vertically interlocked rows of unfolded spaceframes being lifted upward.

Example 3: Interlocking Mechanisms

Figure 7:
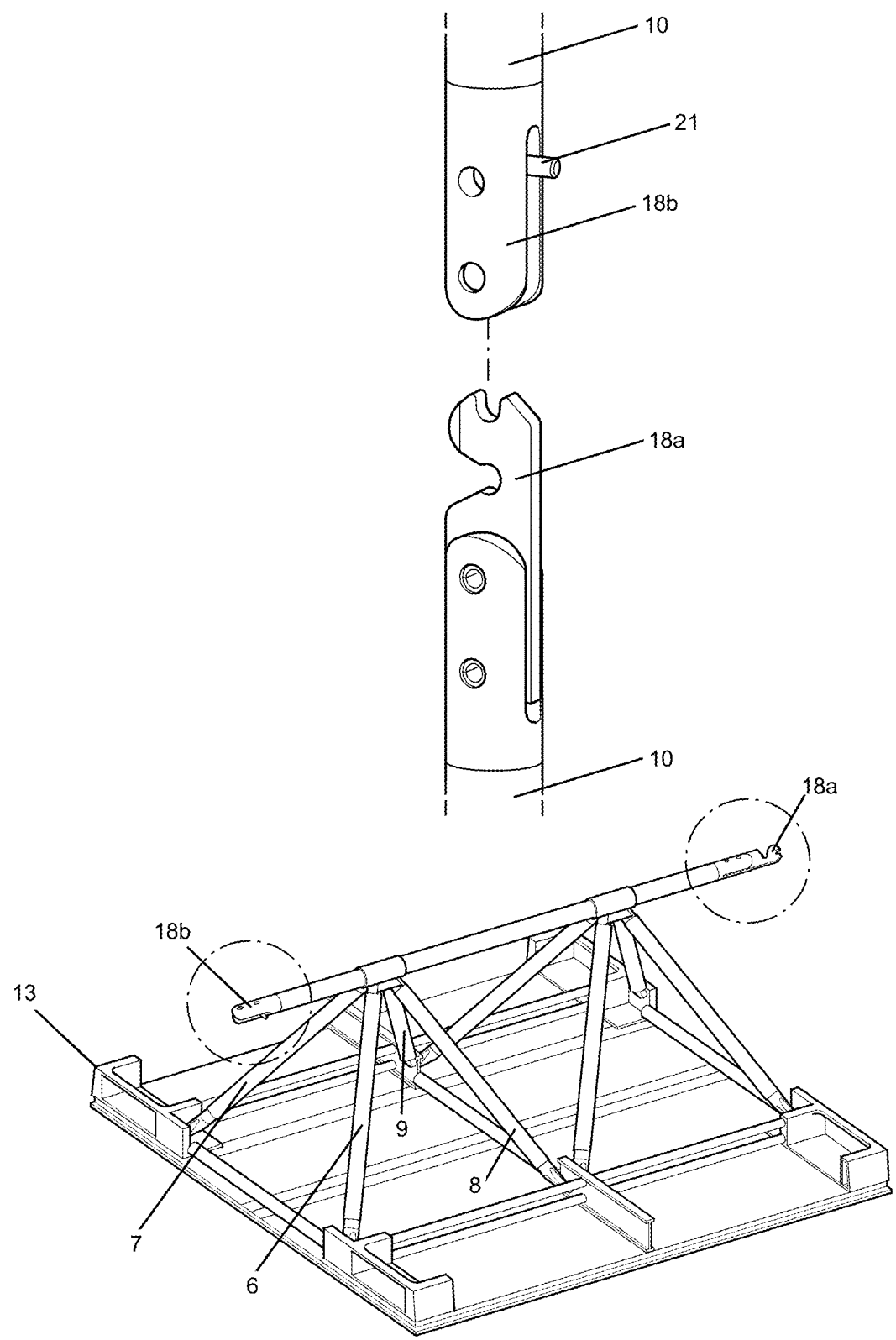
FIG. 7 shows a detailed view of the anterior interlocking elements.

FIG. 7 shows more clearly the precise way in which the anterior interlocking is executed, although the general function has been explained before and is also visible in FIG. 2-5, as well as in others. The male anterior interlocking element (18*a*) is shown to have two indents, one sideways and one extremal, said indents being designed to receive a pin or bar therein. The female anterior interlocking element (18*b*) comprises a groove set to receive the male anterior interlocking element (18*a*). Note that on the inside of said groove, two pins or bars are present, although not visible in the Figures. A first fixed bar, lower in the case of FIG. 7 traverses the groove and is thus perpendicular to thereto. This bar cannot move with respect to the female anterior interlocking element (18*b*) and is designed to be received in the sideways indent of the male anterior interlocking element (18*a*), thereby blocking further movement through the groove. Note furthermore that the male anterior interlocking element (18*a*) has a skewing edge at the end, which then drops down into the extremal indent. The skewing edge of the male anterior interlocking element (18*a*) is designed to push up a second pin or bar of the female anterior interlocking element (18b), said second pin or bar being somewhat movable along the axis of the connector beam (10) (as mentioned, typically a few mm to a few cm) and again traverses the groove perpendicularly. As the male anterior interlocking element (18a) is pushed further into the groove of the female anterior interlocking element (18b), the second pin is pushed upwards until it falls in to the extremal indent, thereby blocking the male anterior interlocking element (18a) from moving back, and as such, interlocking the male anterior interlocking element (18a) and the female anterior interlocking element (18b) with each other. This second pin furthermore comprise a toggle or pin or other extension (21) which can be used to move the second pin along the mentioned movement axis to disengage the anterior interlocking elements (18a, 18b) from each other. However, this blocking via the second pin or bar is not crucial, as the second truss frame (3) will in fact prevent the anterior interlocking elements (18a and 18b) from disengaging when said second truss frame (3) is unfolded and locked into the first truss frame (2) via the locking elements thereof (11 and 12).

Figure 8:
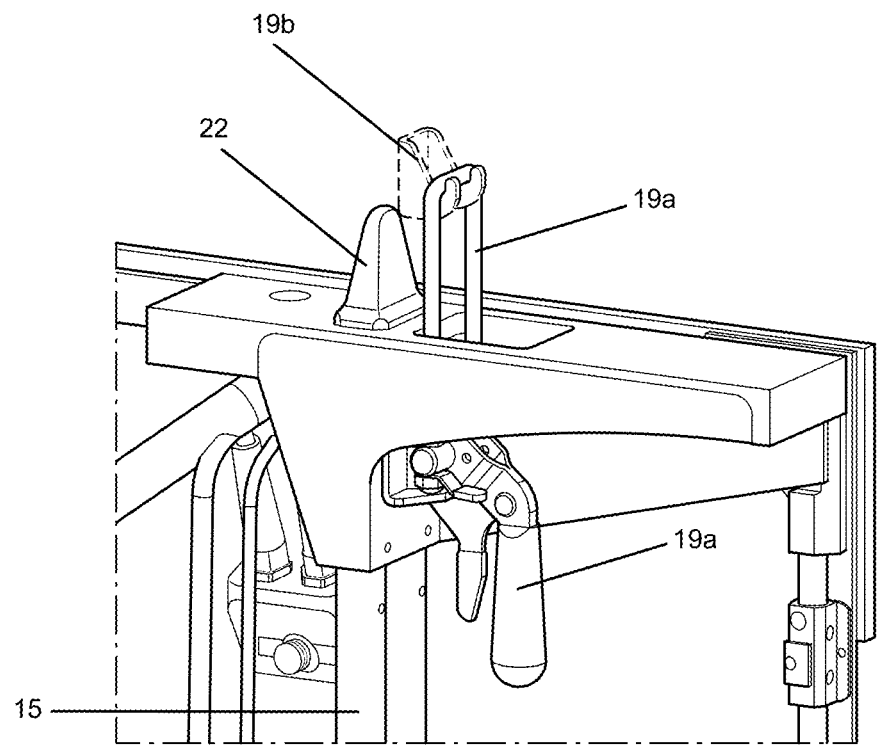
FIGS. 8 and 9 show a detailed view of the longitudinal interlocking elements (male and female).
Figure 8:
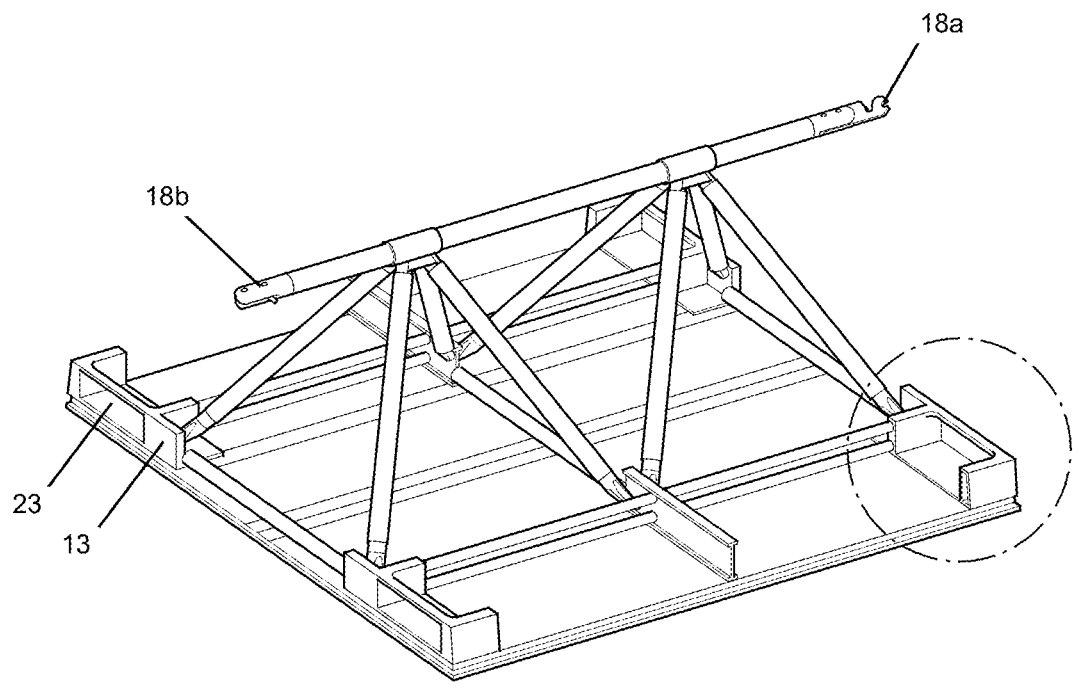
Figure 9:
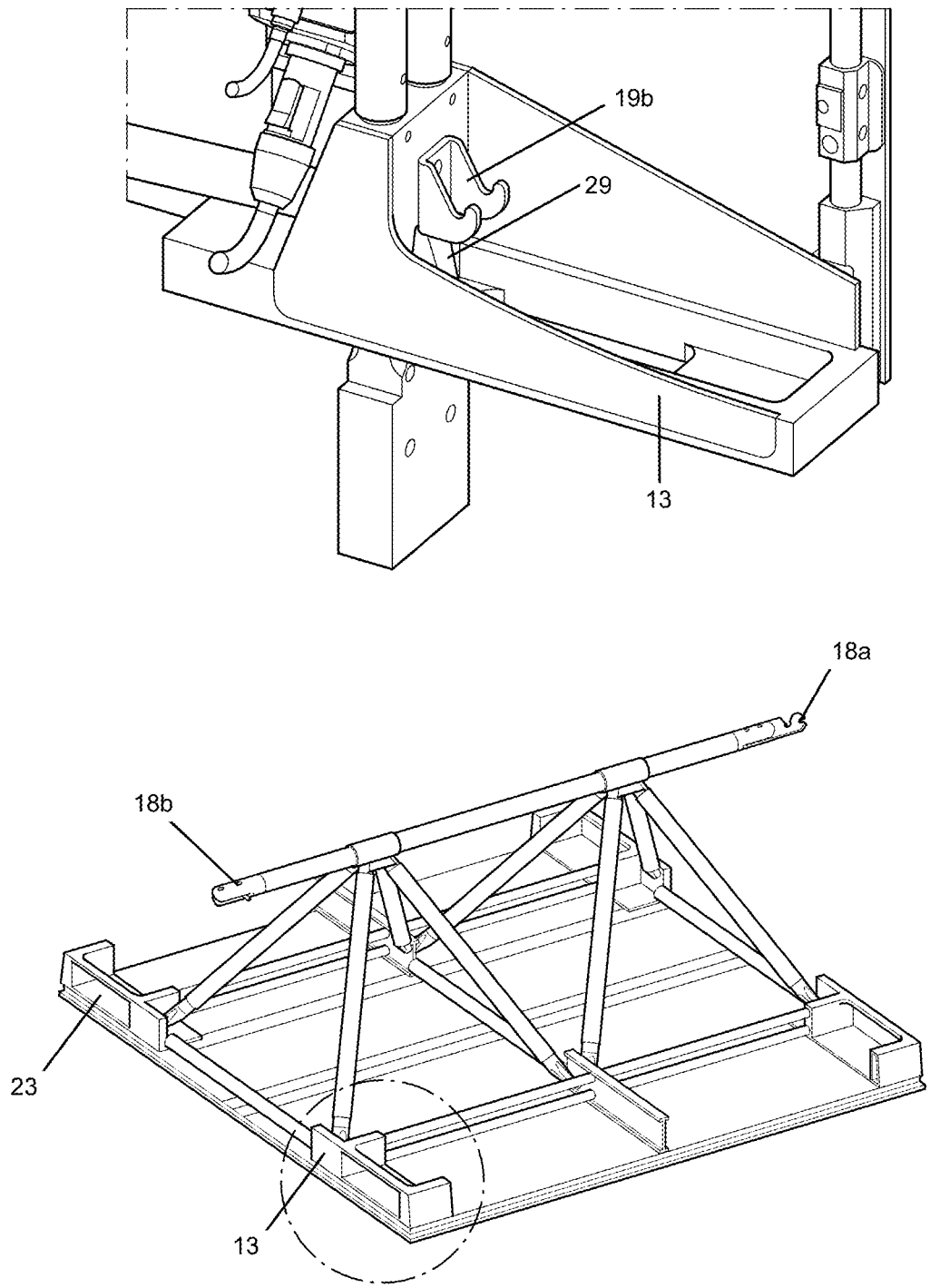

FIGS. 8 and 9 show the longitudinal interlocking elements (19a, 19b) more clearly, in this case a latch clamp (19a) with a hook (24) and a latch (19b), which are provided on a corner element (20). Noteworthy are the openings (23) of said corner elements for the longitudinal interlocking elements (19a and 19b) to engage each other, and which openings (23) also guide said longitudinal interlocking elements during the coupling to assure proper alignment. Further of note is the extrusion (22) in FIG. 8, and the indent (29) in FIG. 9, which are used, as visible in FIG. 9, to aid in the alignment of the spaceframes, as the extrusion (22) will fit into the indent (29) to ensure proper alignment.

Example 4: Angled Lateral Configuration

Figure 10A:
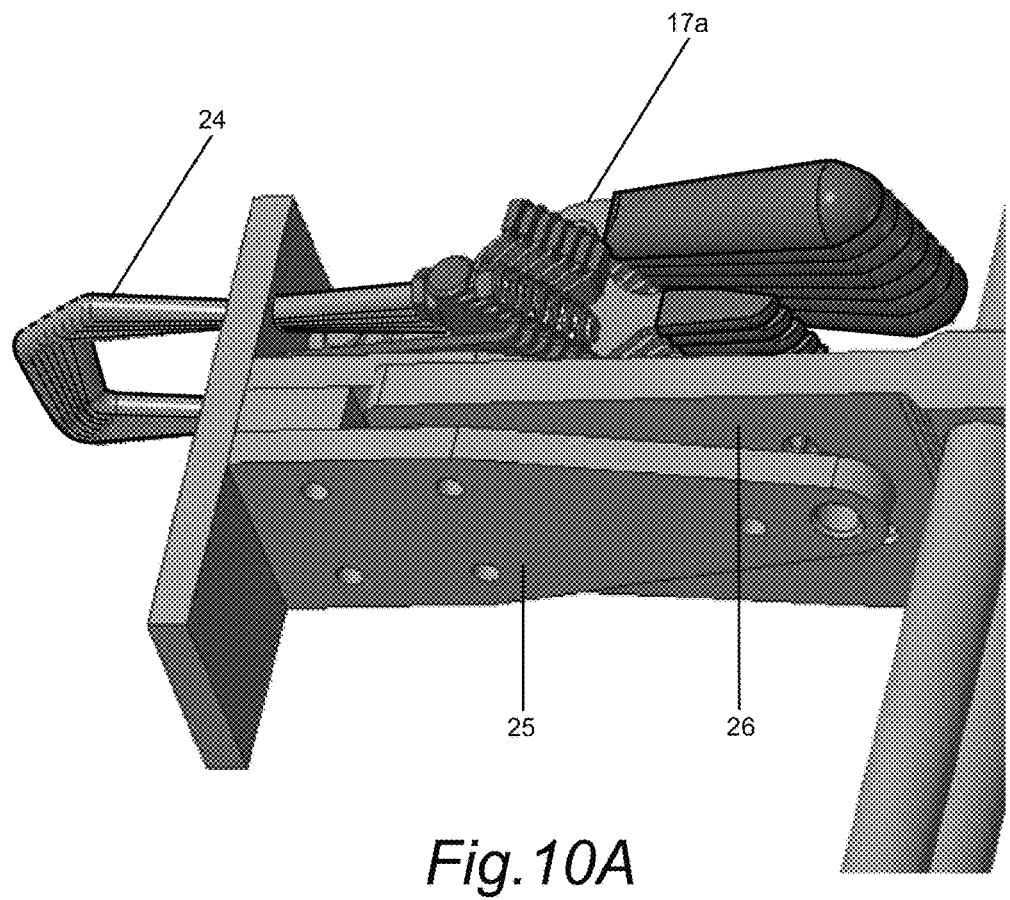
FIG. 10A-D show an enlarged view of the settable lateral interlocking elements to allow an angle between neighboring spaceframes FIG. 11A, B, C show an embodiment of the spaceframe of the invention in various phases of unfolding.
Figure 10B:
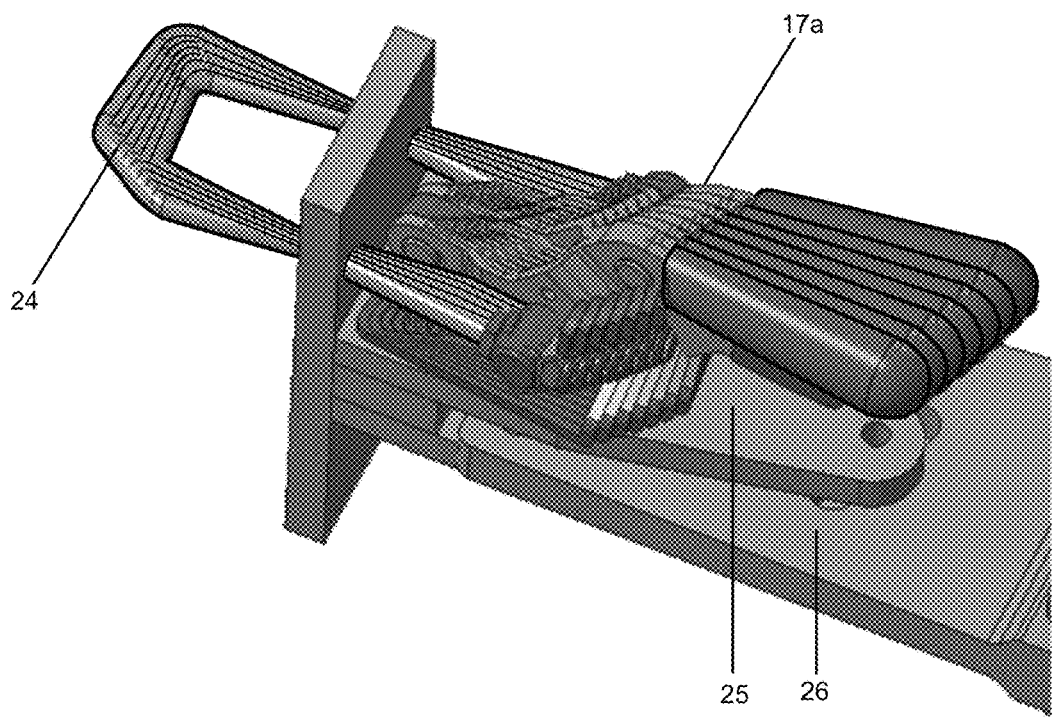
Figure 10C:
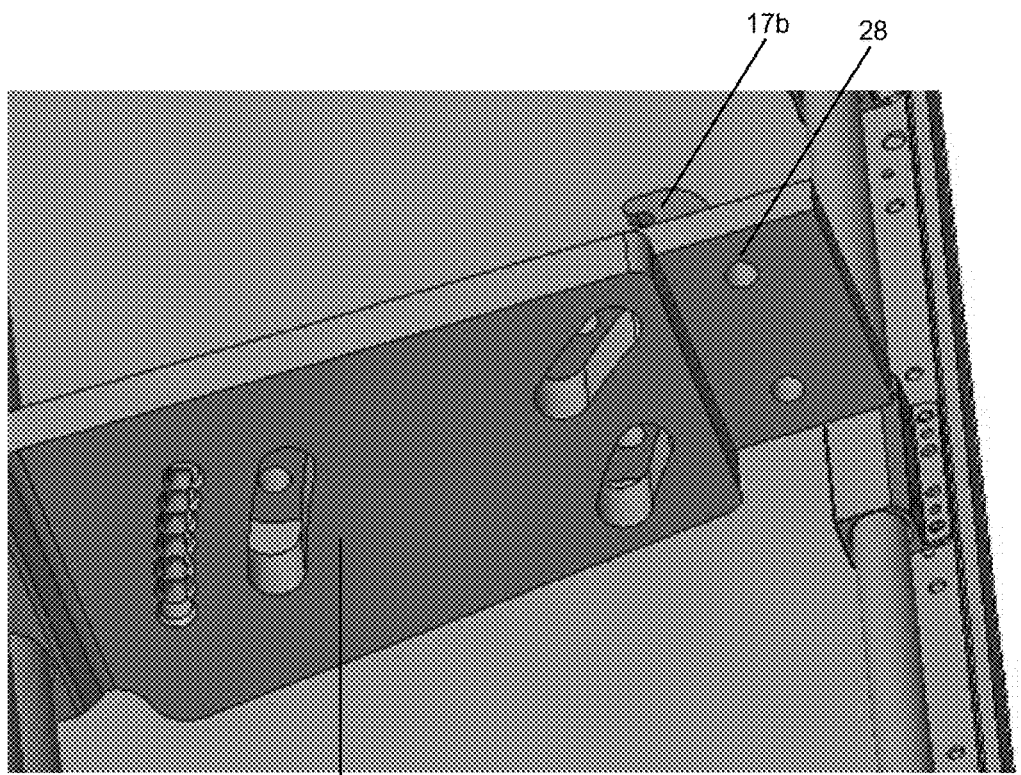
Figure 10D:
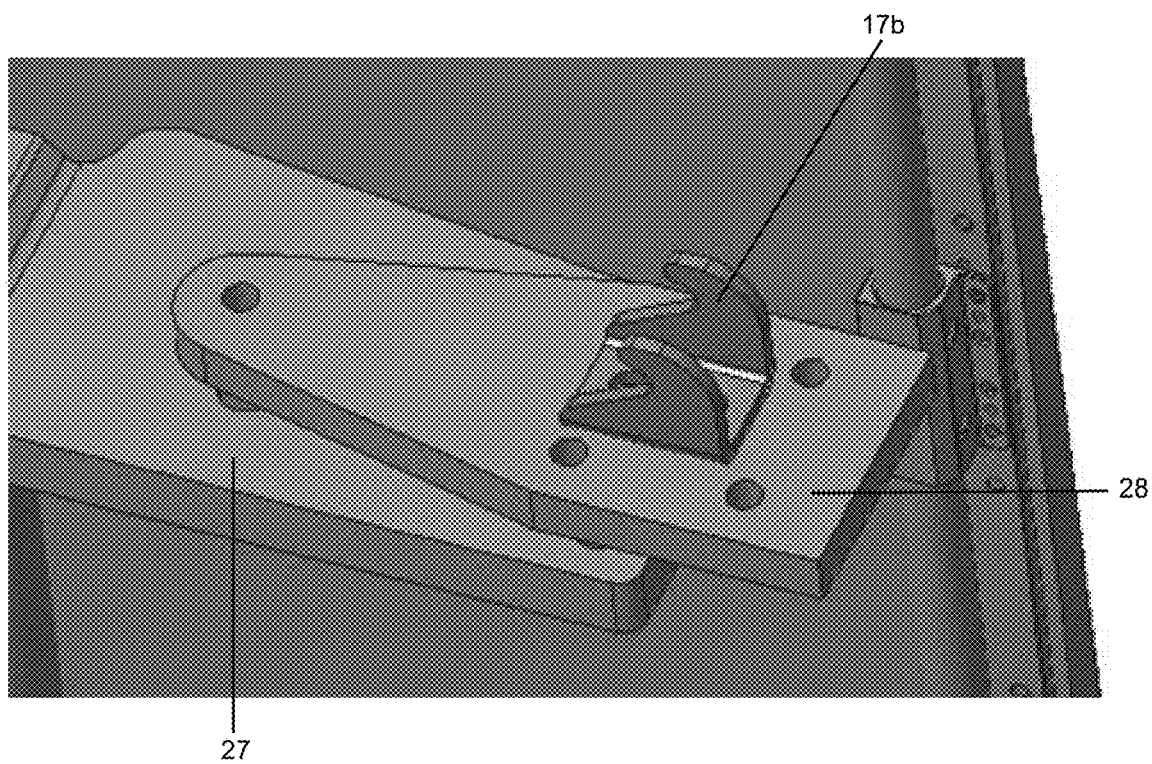

The FIG. 10A-D show the mechanism which allows a range of settable angled positions of laterally neighboring spaceframes with respect to each other. As can be seen, both the male lateral interlocking element (17a) as the female lateral interlocking element (17b) have a base (respectively 25 and 28) which is shiftably placed on a support (respectively 26 and 27), usually the spacer element (16) of some embodiments. The shifting allows a number of positions to be set and fixed via bolts or other fixing elements, as can be seen in the Figures. Note that FIG. 10A-B is a stroboscopic figure which shows the male lateral interlocking element (17a) in a number of possible position in a single figure.

It is supposed that the present invention is not restricted to any form of realization described previously and that some modifications can be added to the presented embodiment of fabrication without reappraisal of the appended claims. For example, the present invention has been described referring to spaceframes, but it is clear that the invention can be applied to general trussing for instance or to scaffoldings.

What is claimed is:

1. A foldable modular spaceframe comprising:
    a polygonal front frame having at least one holding structure;
    a rigid and planar first truss frame, said first truss frame comprising at least first and second hinge arms and a first longitudinal connector beam, whereby said first truss frame is hingedly attached with the first and second hinge arms to the front frame at one end of the first and second hinge arms, each of the hinge arms being attached at said one end to the front frame towards opposite edges of the front frame, whereby said first connector beam rigidly connects other ends of the hinge arms opposite to the one end of the hinge arms, where the other ends of the hinge arms are not attached to the front frame,
    a first hinge connection connected to the first and second hinge arms, around which the first truss frame hinges, and forming a first hinge axis, that is parallel to the first connector beam;
    a first locking element on a first end of said first connector beam;
    a rigid and planar second truss frame, said second truss frame comprising at least third and fourth hinge arms, and a second longitudinal connector beam, whereby said second truss frame is hingedly attached with the third and fourth hinge arms to the front frame at one end of the third and fourth hinge arms, each of the hinge arms being attached at said one end to the front frame towards opposite edges of the front frame, whereby said second connector beam rigidly connects other ends of the hinge arms opposite to the one end of the hinge arms, where the other ends of the hinge arms are not attached to the front frame;
    a second hinge connection connected to the third and fourth hinge arms, around which the second truss frame hinges, and forming a second hinge axis, parallel to the first hinge axis, and whereby other ends of the third and fourth hinge arms opposite to the one end of the hinge arms, where the other ends of the hinge arms are not attached to the front frame, detachably interlock with the locking elements of the connector beam of the first truss frame,
    a second locking element on a first end of said second connector beam, the first end of said second connector beam facing to said first end of said first connector beam and said second locking element facing to said first locking element; whereby said other ends of the hinge arms comprise locking elements for said detachable interlocking;
    wherein the first hinge axis of the first truss frame lies in a first plane, and the second hinge axis of the second truss frame lies in a second plane, where both said first frame and said second frame are parallel to the front frame, thereby allowing the first and the second truss frame to be folded towards the front frame to a substantially parallel position to said front frame,
    and where said first hinge connection moves said first connector beam in a first direction, and said second hinge connection moves said second connector beam in a second direction opposite to the first direction, until the first connector beam is collinear to the second connector beam, and where the first locking element on the first connector beam connects to the second locking element on the second connector beam when the first connector beam is collinear to the second connector beam.

2. The spaceframe as in claim 1, wherein said first and second planes are spaced from each other by at least 20 mm.

3. The spaceframe according to claim 1,
    whereby the first truss frame comprises two additional hinge arms, said additional hinge arms at one end being hingedly attached to the front frame along the first hinge axis and are adapted to hinge around said first hinge axis, whereby the additional hinge arms join each join one of the hinge arms at one of the locking elements of the connector beam, whereby said additional hinge arms are attached to the front frame towards a central region of the front frame;

whereby the second truss frame comprises two additional hinge arms, said additional hinge arms at one end being hingedly attached to the front frame along the second hinge axis and are adapted to hinge around said second hinge axis, whereby the additional hinge arms join each join one of the hinge arms at the ends thereof not attached to the front frame, whereby said additional hinge arms are attached to the front frame towards a central region of the front frame.

4. Foldable modular spaceframe according to claim 3, whereby the first and second truss frame are furthermore connected to the front frame via the additional hinge arms to a protruding spacer element on each side, which spacer element extends to the nearest edge parallel to the first or second hinge axis.

5. Foldable modular spaceframe according to claim 1, whereby said front frame comprises two, panels, whereby said panels comprise a back and a front, said front comprising one or more power management systems, suitable for being wiredly coupled to an external power supply for receiving power, and adapted to receive control signals wiredly from an external control system, whereby said power management system is positioned substantially along the first and/or the second hinge axis excepting regions of said hinge axes where the hinge arms are attached to the front frame, and whereby said first and second hinge axis are distanced from each other over a distance higher than the distance between the first hinge axis and the connector beam, and higher than the distance between the second hinge axis and the unattached ends of the hinge arms of the second truss frame.

6. Foldable modular spaceframe according to claim 1, whereby the front frame is substantially rectangular and whereby the first and second hinge axis are substantially perpendicular to a first and a second edge of the substantially rectangular front frame and substantially parallel to a third and fourth edge of the front frame, whereby the third and the fourth edge of the front frame each comprise at least one lateral interlocking element, said lateral interlocking elements being suitable for detachably interlocking with a lateral interlocking element of a different foldable modular spaceframe, whereby the first hinge axis and the second hinge axis are distanced from the third and fourth edges over at least 15% of the length of the first edge.

7. Foldable modular spaceframe according to claim 6, whereby the lateral interlocking element on the third edge comprises a lateral latch clamp, and whereby the lateral interlocking element on the fourth edge comprises a lateral latch, whereby said lateral latch clamp is suitable for detachably clamping a lateral latch of a different foldable modular spaceframe, and whereby said lateral latch is suitable for being detachably clamped by a lateral latch clamp of a different foldable modular spaceframe, whereby said lateral latch clamp is positioned towards a central region of the third edge and whereby said lateral latch is positioned towards a central region of the fourth edge.

8. Foldable modular spaceframe according to claim 1, whereby the lateral interlocking elements have structure to allow a rigid interlocking to a different foldable modular spaceframe under a settable angle between the front frame of the spaceframe and the front frame of the different spaceframe, whereby said settable angle can be set between 0° and 30°.

9. Foldable modular spaceframe according to claim 1 whereby the first truss frame extends from the first hinge axis over at least 30% of a length of the first edge, and the second truss frame extends over at least 30% of a length of the first edge.

10. Foldable modular spaceframe according to claim 4, whereby a first of the hinge arms of the first truss frame and a first of the additional hinge arms of the first truss frame form a substantially triangular structure with a part of the first hinge axis, said first of the hinge arms and said first of the additional hinge arms being angled with respect to the first hinge axis over an angle of at least 45°, at least 60°, and whereby said first of the additional hinge arms is hingedly attached to the front frame towards the middle of the first hinge axis;

whereby a second of the hinge arms of the first truss frame and a second of the additional hinge arms of the first truss frame form a substantially triangular structure with a part of the first hinge axis, said second of the hinge arms and said second of the additional hinge arms being angled with respect to the first hinge axis over an angle of at least 45°, at least 60°, and whereby said second of the additional hinge arms is hingedly attached to the front frame towards the middle of the first hinge axis;

whereby a first of the hinge arms of the second truss frame and a first of the additional hinge arms of the second truss frame form a substantially triangular structure with a part of the second hinge axis, said first of the hinge arms and said first of the additional hinge arms being angled with respect to the second hinge axis over an angle of at least 45°, at least 60°, and whereby said first of the additional hinge arms is hingedly attached to the front frame towards the middle of the second hinge axis;

whereby a second of the hinge arms of the second truss frame and a second of the additional hinge arms of the second truss frame form a substantially triangular structure with a part of the second hinge axis, said second of the hinge arms and said second of the additional hinge arms being angled with respect to the second hinge axis over an angle of at least 45°, at least 60°, and whereby said second of the additional hinge arms is hingedly attached to the front frame towards the middle of the second hinge axis.

11. Foldable modular spaceframe according to claim 1, whereby a projection of the first connector beam perpendicular to the front frame on said front frame extends from a first edge to an oppositely positioned second edge of the front frame, and whereby said first connector beam comprises anterior interlocking elements on each longitudinal end, each anterior interlocking element for detachably interlocking with an anterior interlocking element of a different foldable modular spaceframe, whereby the anterior interlocking element on a first of said longitudinal ends is a male anterior interlocking element, and the anterior interlocking element on a second of said longitudinal ends is a female anterior interlocking element, adapted for detachably receiving the male anterior interlocking element of the different foldable modular spaceframe.

12. Foldable modular spaceframe according to claim 11, whereby said first edge and said second edge furthermore comprise a longitudinal interlocking element towards each end of said first and second edge, said longitudinal interlocking element being suitable for detachably interlocking with an longitudinal interlocking element of a different foldable modular spaceframe, whereby the longitudinal interlocking elements on the first edge are male longitudinal interlocking elements and the longitudinal interlocking elements on the second edge are female longitudinal interlocking elements, adapted to detachably receiving a male longitudinal interlocking element of the different foldable modular space frame.

13. Foldable modular spaceframe according to claim 12, whereby the spaceframe comprises a number of reinforced corner elements, attached to the back of the polygonal spaceframe to the corners thereof, whereby the hinge arms of the first and the second truss frames are hingedly connected to the front frame at said reinforced corner elements, and whereby the longitudinal interlocking elements are integrated in the reinforced corner elements.

14. Foldable modular spaceframe according to claim 13, whereby the longitudinal interlocking elements on the first edge each comprise a latch clamp, and whereby the longitudinal interlocking elements on the second edge each comprise a latch, whereby said latch clamp is suitable for detachably clamping a latch of a different foldable modular spaceframe, and whereby said latch is suitable for being detachably clamped by a latch clamp of a different foldable modular spaceframe, whereby said latch clamp is positioned to be closed via application of a force on the latch clamp substantially toward a central region of the spaceframe and/or of the first edge, and substantially parallel to the front frame.

15. A method of erecting a wall from a foldable modular spaceframe comprising:
   Providing at least two folded spaceframes, each said spaceframe having:
   a. a polygonal front frame having holding structure;
   b. a rigid and planar first truss frame, said first truss frame comprising at least two hinge arms and a longitudinal connector beam, whereby said first truss frame is hingedly attached with the hinge arms to the front frame at one end of the hinge arms, each of the hinge arms being attached at said one end to the front frame towards opposite edges of the front frame, whereby said connector beam rigidly connects the ends of the hinge arms not attached to the front frame,
   c. whereby the first truss frame hinges around a first hinge axis to which the connector beam is substantially parallel, and whereby said connector beam comprises at least two locking elements;
   d. a rigid and planar second truss frame, said second truss frame comprising at least two hinge arms, whereby said second truss frame is hingedly attached with the hinge arms to the front frame at one end of the hinge arms, each of the hinge arms being attached at said one end to the front frame towards opposite edges of the front frame,
   e. whereby the second truss frame hinges around a second hinge axis, to which the first hinge axis is substantially parallel, and whereby the ends of the hinge arms not attached to the front frame, are adapted for detachably interlocking with the locking elements of the connector beam of the first truss frame, whereby said unattached ends of the hinge arms comprise locking elements for said detachable interlocking; and
   whereby the hinge axis of the first truss frame lies in a first plane, and the hinge axis of the second truss frame lies in a second plane, where both said first frame and said second frame are parallel to the front frame, thereby allowing the first and the second truss frame to be folded towards the front frame to a substantially parallel position to said front frame,
   aligning said spaceframes and positioning said spaceframes substantially vertically, whereby the first and the second hinge axes are positioned substantially vertical,
      unfolding a first spaceframe from first and second sets, where each set includes a first truss frame and a second truss frame, by unfolding the first truss frame, unfolding the second truss frame and interlocking the first truss frame with the second truss frame at the longitudinal connector beam of the first truss frame;
   laterally interlocking the unfolded spaceframes with neighboring unfolded spaceframes, thereby creating a row of laterally interlocked spaceframes by hinging said connector beam of the first set in a first direction, and hinging said connector beam of the second set in a second direction, said second hinge connection moves said second connector beam in a second direction, until the connector beam of the first set is collinear to the connector beam of the second set, and where a locking element on the connector beam of the first set connects to another locking element on the connector beam of the second set when the connector beam of the first set is collinear to the connector beam of the second set; lifting the row of laterally interlocked spaceframes vertically to a position hanging closely above the sets of the remaining spaceframes;
   repeating unfolding and interlocking on other spaceframes, thereby creating a new row of laterally interlocked spaceframes;
   vertically interlocking the new row of laterally interlocked spaceframes to the row of laterally interlocked spaceframes hanging closely above the new row to create vertically interlocked rows; and
   lifting the vertically interlocked rows of laterally interlocked spaceframes vertically to a position hanging closely above the sets of the remaining spaceframes.

16. The method as in claim 15, wherein
   each spaceframe is provided on a dolly adapted for holding the spaceframes, in the sets over a regular distance from each other.

17. The method as in claim 15, wherein the spaceframes are provided in a position wherein the first edges comprising the latch clamps faces upwards, whereby said latch clamp is positioned to be closed via application of a force toward a central region of the first edge and substantially parallel to the front frame,
   and whereby the steps of vertically interlocking the new set to the set hanging closely above the new set, are executed by closing the latch clamps of the new set, thereby clamping the latches of the set hanging closely above the new set, whereby closing the latch clamps is executed by applying a force on the latch clamps towards a central region of the spaceframe and/or the first edge thereof, and substantially parallel to the front frame of the spaceframe.

* * * * *